United States Patent [19]
Eberwine

[11] Patent Number: 5,392,052
[45] Date of Patent: Feb. 21, 1995

[54] POSITION REPORTING EMERGENCY LOCATION SYSTEM

[76] Inventor: Mark A. Eberwine, 5714 Oo-Loo-Te-Ka, San Antonio, Tex. 78218

[21] Appl. No.: 53,222

[22] Filed: Apr. 28, 1993

[51] Int. Cl.⁶ .......................... H04B 7/185; G01S 5/02
[52] U.S. Cl. .................................................. 342/357
[58] Field of Search ........................................ 342/357

[56] References Cited

U.S. PATENT DOCUMENTS

| | | | |
|---|---|---|---|
| 4,814,711 | 3/1989 | Olsen et al. | 342/357 |
| 5,124,915 | 6/1992 | Krenzel | 364/420 |
| 5,193,215 | 3/1993 | Olmer | 455/66 |
| 5,223,844 | 6/1993 | Mansell et al. | 342/357 |

Primary Examiner—Theodore M. Blum
Attorney, Agent, or Firm—Donald H. Fidler

[57] ABSTRACT

A position reporting emergency locating system utilizes a satellite navigational system to continuously monitor the position of a craft relative to the earth's surface and to repetitively obtain and record it's position as a function of real time as to position, heading and other parameters including the craft identification. An event responding initiator such as an accelerometer or sudden descent determination automatically transmits a position and craft identification to a remote receiver or other craft for relay. The system can be accessed, controlled and/or monitored by remote receiver and transmitter devices. The parameters are logged in a memory.

18 Claims, 17 Drawing Sheets

POSITION REPORTING EMERGENCY LOCATION SYSTEM

FIELD OF INVENTION

This invention relates primarily to the field of aviation, and more particularly, to the detection and reporting of in-flight data relative to an aircraft to provide assistance in the event of an emergency to assist rescue efforts. By utilizing a manual switch activation, however, the device is also suitable for land or water vessels.

BACKGROUND OF THE INVENTION

Lifesaving aircraft rescue operations begin as soon as the aircraft location is known and the amount of rescue effort required is determined. Currently a device called an Emergency Locator Transmitter (ELT) is activated whenever the aircraft experiences a high-G impact (i.e. crashes). ELT's have been in use in aircraft for many years. There are several models but all have basically the same function, i.e. upon activation the ELT transmits a continuous or pulsed signal. There are several limitations to the use of ELT's currently in service. For example:

1) The signal transmitted by the ELT is a continuous wave (CW) signal that is initially detected by satellites or other aircraft. The relative strength of the signal is utilized by multiple receivers in a method called triangulation to determine the approximate location of the transmitting ELT. Triangulation takes time and the time spent triangulating is time not spent providing medical aid. Triangulation typically locates the source of the signal to a 6 mile radius.

2) The magnitude of the rescue effort required is not known until there is a visual sighting or a coincidental overdue aircraft. Most current ELT devices have no method of identifying the source of the signal.

3) Currently, it is estimated that over 95% of ELT activation's are non emergency (inadvertent or otherwise). Due to the cost of a search effort, rescue personnel are not immediately dispatched because of the strong likelihood of a false signal. With a beacon there is no way of knowing if the signal is an accidental or emergency activation. Thus, rescue personnel are not dispatched until the origin of the signal is determined to be of an emergency basis.

4) Because a visual sighting is required, adverse weather conditions can hinder the search efforts.

5) In many instances, the search must be completed successfully before the transmitter depletes the power source because once the ELT stops transmitting, the search effort can no longer utilize the transmitter as a homing signal.

6) In cases where fire or fuel spillage is involved, ELT signals typically last only a few seconds before ELT failure—an inadequate amount of time to triangulate.

7) The condition of the ELT's battery power source is not known until activation. Batteries are merely replaced once a year. The ELT battery may not work at all.

THE PRESENT INVENTION

The present invention will enable search and rescue personnel (SAR) to immediately dispatch the required rescue effort to an exact aircraft location. The present invention will greatly reduce false responses because a craft ID is incorporated into the system. The invention also incorporates a rechargeable battery source with a battery charge and test circuit.

A log of the craft's position history is kept to determine every location that the craft has been at rest (stationary).

In the present invention the physical embodiment of the invention employs a Global Positioning System (GPS) receiver, a radio modem transceiver for query and programming, a radio modem transmitter, an accelerometer, non-volatile (NV) storage memory, a battery backup power source, a remote cockpit activator/indicator panel with host interface serial port, and a master controller circuit card with a central processing unit (CPU).

With the Navstar Global Positioning System (GPS), The Department of Defense (DOD) has constructed a system of satellites in orbit which transmit signals where the transmitted signals are utilized by specialized GPS receivers to determine the receiver's position in latitude and longitude as well as altitude(above sea level) anywhere on earth, to within an accuracy of well under 100 meters (usually within 25 meters). In the present invention, this position determination technology is combined with digital data transmission methods to provide an efficient low cost locator system.

The apparatus of the invention includes a complete GPS receiver (self contained antenna and associated processing hardware, with data port) which utilizes signals received from satellites of the Navstar GPS system for providing data representative of a present craft position, time identification, and velocity information to a master control CPU when the GPS receiver and the CPU are interconnected for an interactive relationship by a serial data bus interface. The data is time sequenced or spaced to provide sequentially time spaced data segments. A present craft position data as well as other data is stored in data packets in a non-volatile memory and is accessed by the master control CPU in response to an emergency activation or in response to commands received from a remote located host computer either by radio modem or by a serial data interface at the cockpit panel. The serial data interface allows for programming craft ID during installation. The master control CPU communicates with the GPS receiver. The GPS receiver receives information from the satellites in the external Navstar GPS system and the external world using a data command and status means. A data command or a status is defined as unique organized groupings of bytes of information that will be recognized by a master remote located control computer, GPS system and any other device connected for interaction with the master remote located control computer via the radio modem receiver (radio connection).

Each time data is generated by the GPS receiver and time sequenced in the CPU, a position, time, velocity, and heading update occurs. The update information in the CPU is stored in a circular position history or memory buffer with six positions. The CPU continuously runs a series of software based processing algorithms to make certain determinations based on the current position data relative to the previous position data. For example, utilizing the processing algorithms, the CPU can determine from the velocity data in the GPS if the craft is stationary or is making a rapid descent (defined as a change of altitude, from one position update to the next, exceeding some pre-programmed maximum (altitude from the GPS).

In the event of a rapid descent determination, accelerometer activation, or manual cockpit activation, the present invention transmits time, craft ID and position data in a data packet. In the event of radio query from an external or mobil computer, the present invention transmits the requested data packet to the computer.

Transmissions of data packets are groups of information organized into a packet (defined content and sequence) by the CPU and sent to the radio modem transmitter for transmission. All data packet transmissions preferably contain the following information (called data packet herein): a command type identifier field, a data packet byte count, craft identification number (craft ID), packet destination ID, packet sequence number and total packet count number (for multiple packet transmissions), data (present position, position history, etc.), and a packet integrity checksum. The data may contain any of the following: current the three most recent positions and time of positions (presumably current), and the previous three positions, headings and time stamps, acquired immediately prior to emergency activation. The present and previous two positions, both before and after activation, are included for position data integrity checking by rescue personnel. The command type identifier field identifies the transmitted packet as emergency or non-emergency and further identifies the type of transmission activation (i.e. "emergency descent", "cockpit activated", "position history data query response", etc.)

The accelerometer is connected to notify (interrupt) the master control CPU in the event a preset acceleration limit is reached or exceeded. This notification will result in the activation of the CPU to run a software program to format and transmit a data packet with an emergency identifier tag. The emergency type identifier tag for an emergency impact transmission would be "Emergency Impact".

A rapid descent determination algorithm run by the master control CPU will initiate a data packet transmission in the event the preset vertical velocity limit is reached or exceeded. This determination will result in the activation of the master control CPU to run a software program to format and transmit a data packet with an emergency identifier tag. The emergency type identifier tag for a emergency descent transmission would be "Emergency Descent".

The manual activation switch is connected to instruct the master control CPU to initiate a transmission in the event the cockpit crew feels it is necessary to do so. Switch utilization will result in the activation of the CPU to run a software program to format and transmit a data packet with an emergency identifier tag. The emergency type identifier tag for a emergency cockpit initiated transmission would be "Cockpit Activation".

During any emergency activation, the circular position history buffer is reduced from six entries to three entries allowing for position prior to activation and current position to be transmitted. The circular buffer is reduced to three entries by the CPU modifying the start and the end addresses of the circular buffer memory. This reduction is required in anticipation that a catastrophic impact might damage the GPS section resulting in erroneous position data overwriting vital correct position data. Utilizing this scheme, the post activation data could be erroneous but the pre activation data would be valid.

Emergency activation transmissions continue until the CPU receives a command to cease transmission by either via the radio modem receiver or via the serial port, or is reset by the cockpit activation switch. Emergency transmissions continue at a random interval between 3 and 7 seconds for civilian aircraft and between 15 and 45 seconds (variable) for military vehicles. As an option for military use, the embedded master control CPU programming allows the position data to be encrypted and the transmitter could use spread spectrum communications technology.

From consecutive position updates, the CPU can determine if the craft is stationary (the GPS unit will provide velocity data of zero). The CPU will compare a stationary position against a log of stationary positions in the memory NVRAM. If the stationary position is not contained in the stationary position log, the CPU adds the stationary position data to the list. Stationary position information can be extracted by a command to the CPU received from a host computer via the radio modem or via the serial port or the query receiver.

The system contains a rechargeable battery as a backup to the main power source (aircraft supply) to supply power to the CPU and transmitter in the event main power is lost. The CPU continually monitors a battery fault signal from a battery charger Integrated Circuit (IC). In the event the battery fault signal is sensed, the CPU runs a software program to light a cockpit indicator and to format and transmit a data packet at 60 second intervals, until reset, to indicate battery maintenance is required.

Upon power-up, the CPU performs a self-test, commands the GPS unit to begin providing data, performs a battery test, illuminates a cockpit indicator.

The system contains a CPU watchdog timer circuit to detect lack of activity by the CPU. The watchdog timer must be periodically reset by the CPU or the watchdog timer will reset the CPU. This is a safety feature in case of loss of CPU.

Loss of a GPS connection will result in lighting of a cockpit indicator and in transmission of a data packet indicating loss of GPS status at 60 second intervals until reset.

The radio modem and/or serial port allows for interaction with the master control CPU by an external or stationary host CPU. The Host CPU is utilized for programming the craft ID, resetting the emergency transmit function, and for performing craft ID and data query functions.

The host CPU may issue commands to command the master control CPU to transmit position data packets at a command specified interval until a second command is received to cease the transmissions. No cockpit indication of transmit command need be given.

Since each PRELT is a constant listener to the airwaves, it is possible to utilize each PRELT device as relay of emergency signals. When a PRELT device intercepts an emergency transmission from another PRELT device, it will reformat the received packet to include it's own craft ID and position and then transmit the modified packet. In this manner every PRELT device enhances the entire monitoring system greatly increasing the probability that a signal will be received.

GENERAL DESCRIPTION OF THE INVENTION

Figure 9:
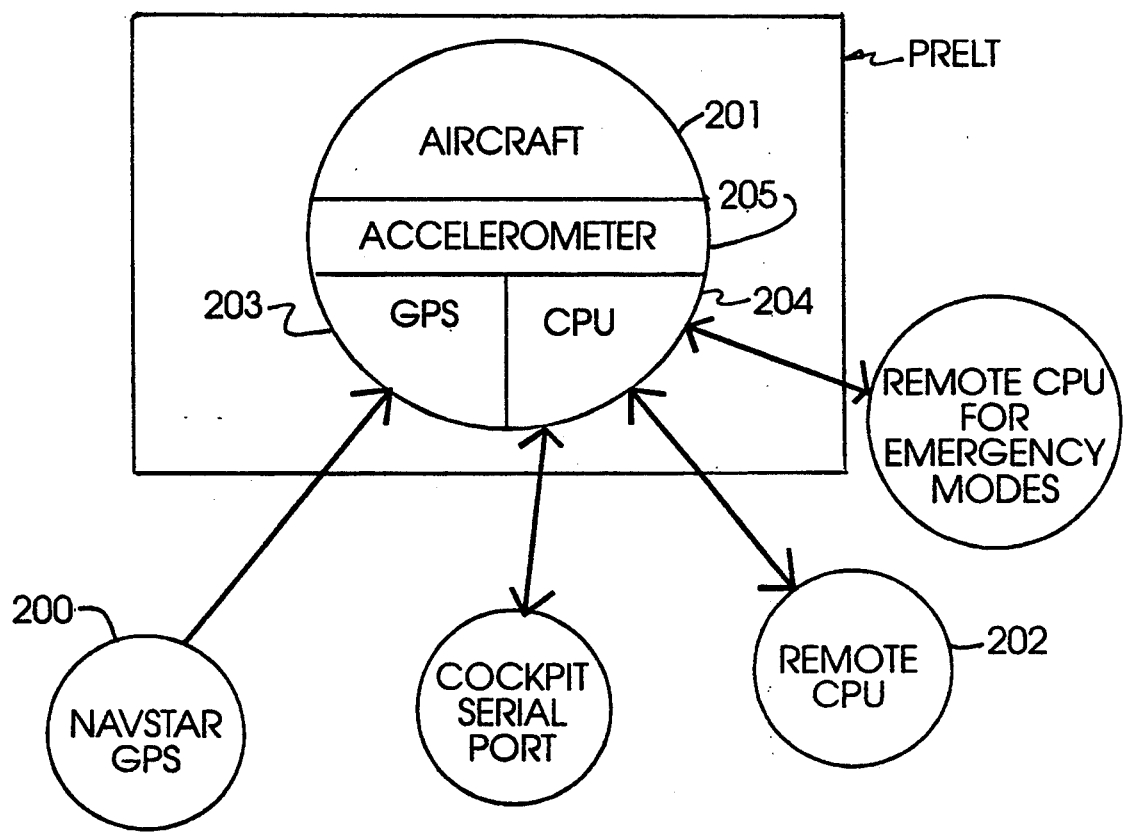
FIG. 9 is a schematic representation of an overall system.

Referring to FIG. 9, the overall system includes use of the Navstar Global Positioning system 200, an aircraft 201, and a remote CPU control system 202. The Navstar GPS system 200 provides for transmission of signals which are received by a GPS receiver 203 in the aircraft 201 and are translatable by a CPU in the GPS receiver 203 to its position in latitude, longitude, and altitude on a real time basis as well as velocity, current time and heading. The CPU system 204 in the aircraft is preprogrammed with data representing a specified craft ID, craft type, maximum descent velocity criteria, minimum velocity criteria to maintain flight and an operational testing criteria. The entire system in the aircraft is sometimes referred to herein as a "PRELT" for a Position Reporting Emergency Locator Transmitter.

The aircraft 201 has an accelerometer 205 which functions to detect sudden impact or sudden acceleration and generate an accelerometer interrupt signal to the CPU 204, so that an "emergency message" data packet transmission can be made. The "emergency message" data package transmission identifies the craft, it's location by longitude, latitude, and altitude and the time. Thus, at any time that an aircraft is subjected to crash type conditions, an emergency message packet transmission with a precise location is transmitted automatically to the remote CPU system 202. It is noted that there may be more than one remote CPU utilized.

In the routine operation of the CPU system 204 in the aircraft, the position is repeatedly determined on a time basis from the GPS system 200 so that position, velocity, altitude, and heading of the aircraft are stored in a memory in the CPU system 204.

A sudden descent of the aircraft is compared to predetermined or preset vertical velocity value. If the vertical velocity value is exceeded, a transmission of the sudden descent event will occur. In addition, the CPU system 204 in the aircraft is programmed to provide a number of other functions which include:

1) sensing ignition power to the aircraft to determine activation condition of the PRELT system;

2) sensing primary power supply in the aircraft to determine if the system has been disconnected;

3) checking for backup battery failure of the PRELT system;

4) checking for PRELT transmission failure;

5) checking PRELT component functions;

6) programming by remote CPU means.

If a malfunction occurs, a data packet transmission of the specific malfunction is transmitted to the remote control system 202.

While position reporting on a precise basis is a major feature of the present invention, there are other attributes of the invention which will be become apparent from the description to follow. For example, a remote (air or ground) CPU system can be utilized to monitor and identify various aircraft in flight.

On Board Unit

Figure 1:
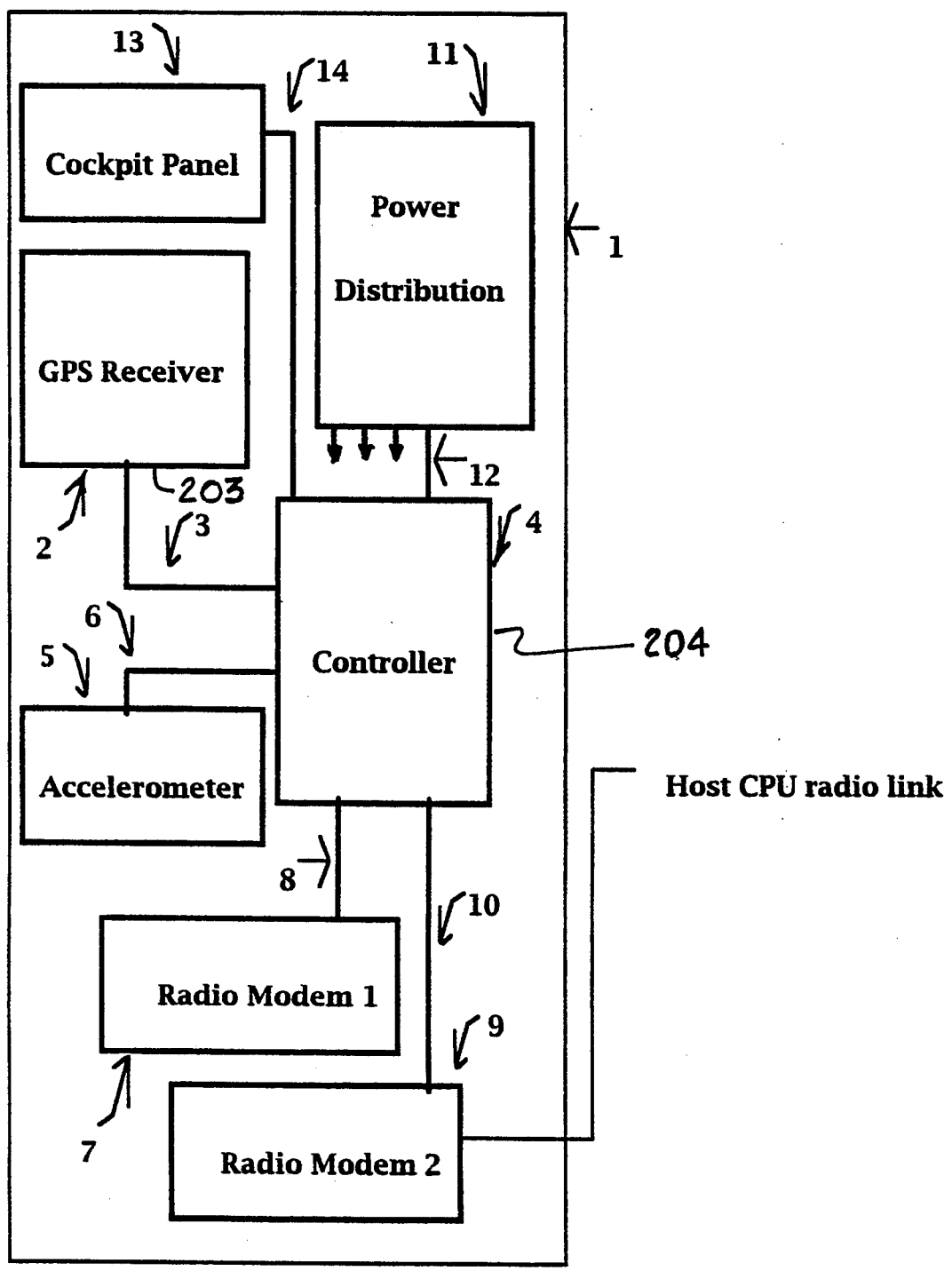
FIG. 1 is a schematic illustration of an Emergency Locator Transmitter System embodying the present invention.

Referring now to FIG. 1, an on-board aircraft unit 1 of the present invention is schematically illustrated in a dashed line block. The on-board craft unit 1 includes a master controller means 204 which receives and is preprogrammed and processes and transmits various data.

The master controller means 204 in the on-board craft unit is programmed to communicate with a GPS Receiver means 203 (via an interface 3), from an accelerometer means 205 (via an interface 6), with a craft-/cockpit panel 13 (via an interface 14), with a radio modem 9 (via an interface 10), and with a radio modem 7 (via an interface 8). Power is supplied to the master controller means 204 and other devices by an electrical power means 11. The GPS receiver means 203 includes its own processors for processing data.

The master controller means 204, when selectively actuated, utilizes the first radio modem means 7 to transmit data to a remote location computer system 202 which can be located at a ground or air location. The second radio modem means 9 is the interface between the master controller means 204 and a remote CPU. The GPS receiver means 203 (containing dedicated on-board processors) is coupled to the master controller means 204 via the serial interface cable means 3. The GPS receiver means 203 receives signals from the Navstar GPS Navigation System 200 (See FIG. 9) to ascertain present position, heading, velocity, and time data at one second (or other appropriate) timed intervals which is sent in a digital data format message to the master control means 204. The data is transferred utilizing an inter-processor message communications protocol specified by the GPS manufacturer (i.e., an NMEA 0183 version 2.0 compatible language). The serial interface cable means 3 consists of data and data flow control signals conforming to the Electronic Industries Association (EIA) RS-232-C interface specification at a data rate of 9600 baud, synchronous, full duplex.

Referring still to FIG. 1, the master controller CPU means 204 is coupled to the radio modem means 7 by the serial interface cable which contains data and data flow control signals conforming to the Electronic Industries Association (EIA) RS-232-C interface specification at a data rate of 9600 baud, synchronous, full duplex. The master Control CPU 15 (see FIG. 2) contained within the master controller CPU means 204 interacts with the first radio modem means 7 to initiate the transmission of digital data packets or messages. The digital data packets are for reception by external, remote, (stationary or mobile) located CPU equipment 202 (i.e. current ELT system satellites, air traffic control systems) and other craft.

The master control CPU means 204 coupled to the second radio modem means 9 by the serial interface cable means 10 contains data and data flow control signals conforming to the Electronic Industries Association (EIA) RS-232-C interface specification at a data rate of 9600 baud, synchronous, full duplex. The master control CPU 15 (see FIG. 2) contained within the master controller CPU means 204 interacts with the radio modem means 9 to receive and to transmit digital data packets. As discussed previously, the radio modem means 9 exists to transmit and receive digital data packets for communication with external surface or mobile CPU equipment 202 (See FIG. 9). The CPU equipment 202 can be used for programming (i.e. craft ID) or for extraction of any data stored in the NVRAM memory 16 (i.e. craft ID, position history information).

Figure 8:
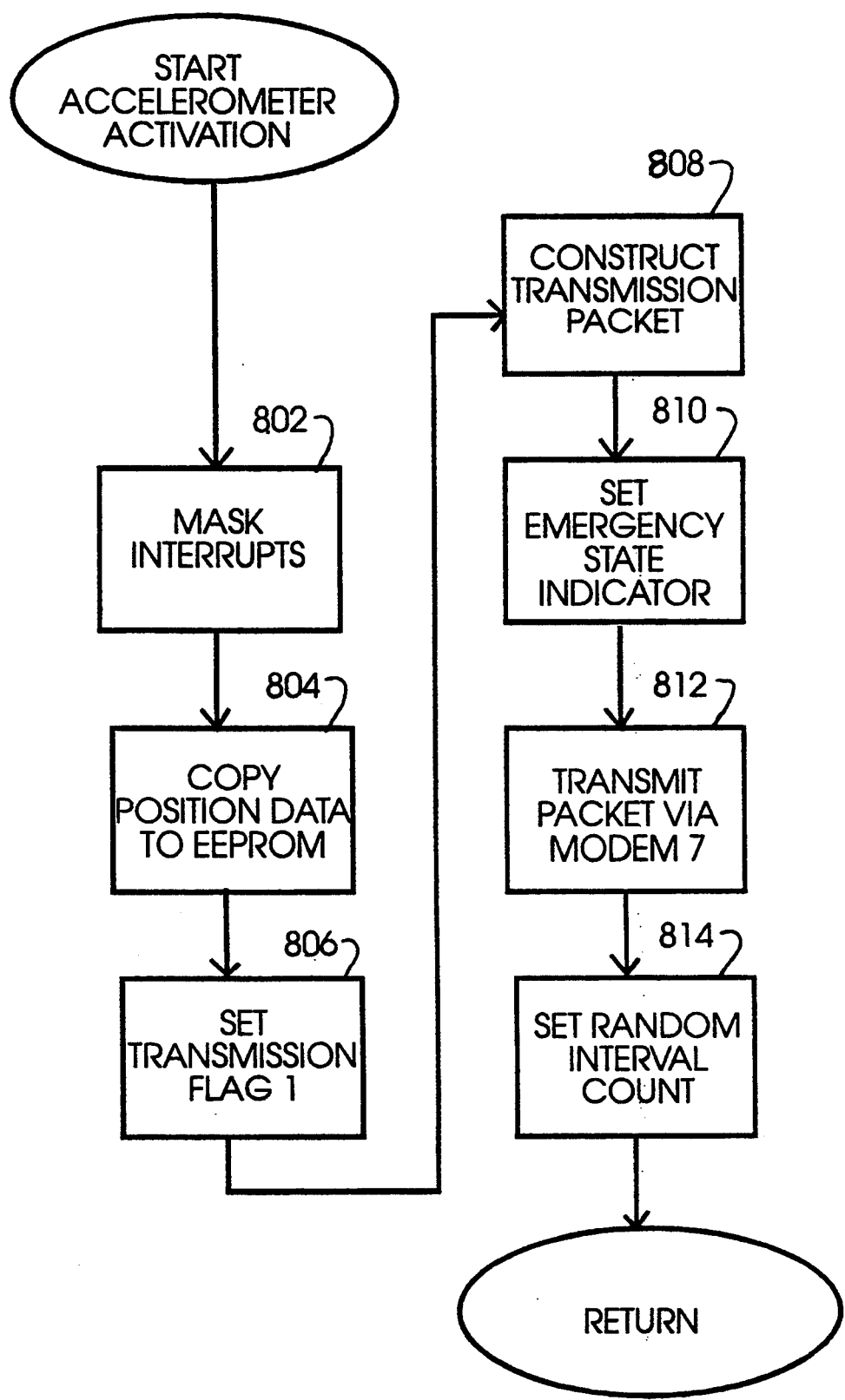
FIG. 8 is a representation of a computer program.

Referring still to FIG. 1, the accelerometer means 205 serves to activate the master control CPU 15 (see FIG. 2) to perform the program steps required (which will be explained in connection with FIG. 8) to transmit an emergency "accelerometer activated" transmission data packet if a sudden acceleration occurs such as a crash event.

During execution of the program within the master control CPU means 15, the current vertical descent rate is compared to the preprogrammed (during installation) maximum vertical descent rate. If the preprogrammed maximum vertical descent value is exceeded, the program flow activates the master control CPU 15 (see FIG. 2) to perform the program steps required (which will be explained in connection with FIG. 5) to transmit an emergency "rapid descent activated" transmission data packet to the remote CPU system 202.

Master Controller

Figure 2:
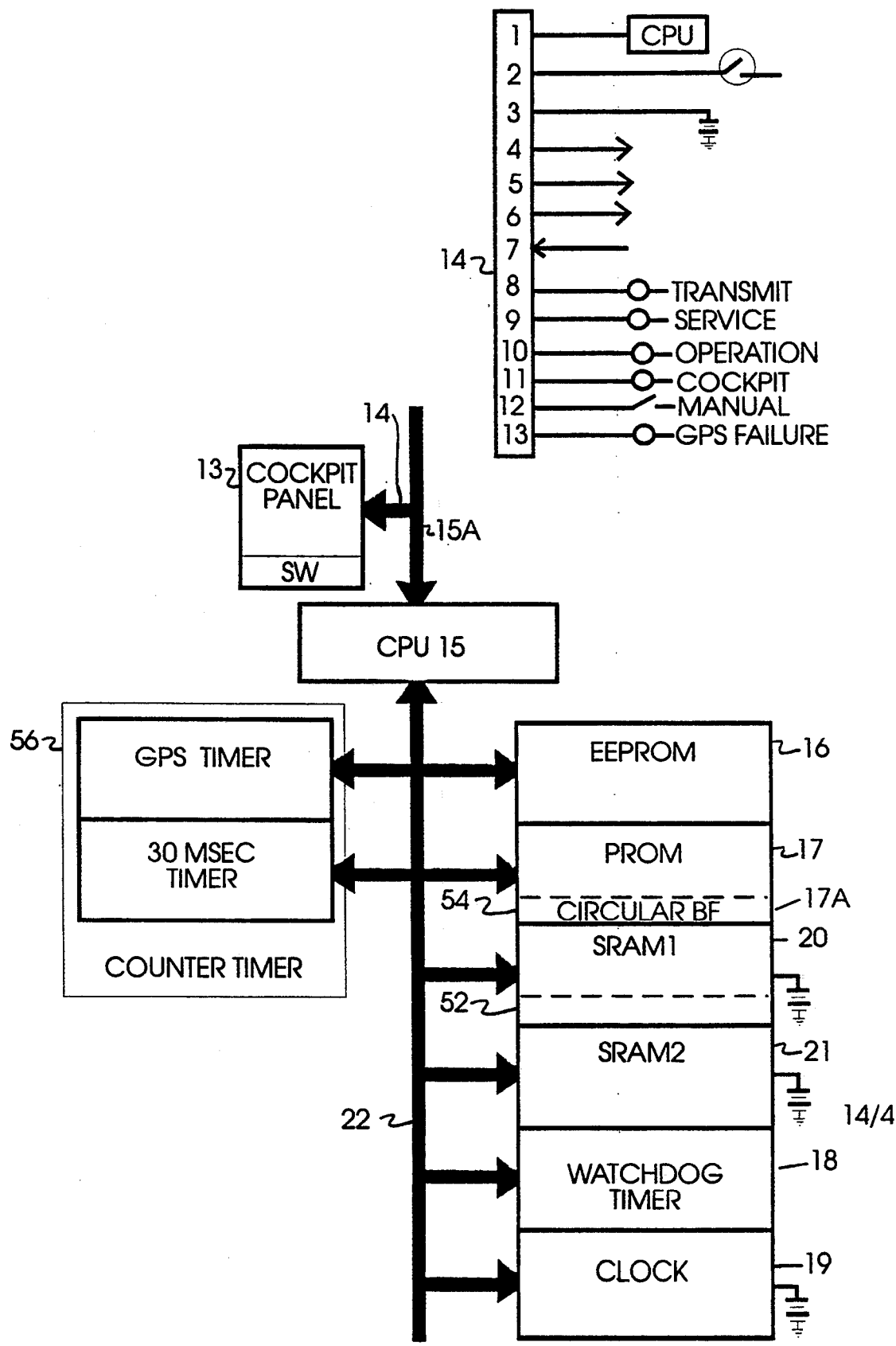
FIG. 2 is an expanded schematic illustration of the master control CPU means 4.

Referring to FIG. 2, the master controller CPU means 204 for the present invention is shown in greater detail. The controller CPU means 204 is preferably a self-contained (all on one circuit card) module incorporating master control CPU 15, a read only program memory 17, a read/write Static Random Access Memory (SRAM) memory with on-board lithium battery backup means 20, a read/write SRAM 21 with a battery backup lead connected to primary power, a read/write EEPROM (Non-volatile) memory 16, a time/day clock with on-board lithium battery backup 19, a watchdog timer and power on reset circuit 18. The control CPU 204 contains a total of four serial ports 15A.

The control CPU 15, the EEPROM means 17, the SRAM means 20, the SRAM means 21, the watchdog timer and power-on reset means 15, the time/day clock means 19, and the EEPROM means 16 are all connected for an interactive interrelationship via a common parallel data bus means 22.

The control CPU 15 interacts 1) with the program memory means 17 via the parallel data bus means 22 for fetching of program execution instructions in the memory means;

2) with the SRAM 20 for the temporary storage of data during execution of program instructions;

3) with the SRAM 21 for the storage and checking of the fixed pattern (i.e. Ox5a5a hexadecimal) to determine if a power disconnection has occurred;

4) with the EEPROM 16 for the long term storage of craft ID, position history log, and circular data entries (circular data entries are copied from SRAM 20 to EEPROM 16 by the control CPU 15 after emergency activation);

5) with the time/day clock 19 for the storage and retrieval of current time.

The control CPU 15 utilizes the serial ports 15A for the transfer of commands, status, and data to/from the GPS receiver means 203, the radio modem means 7 and 9, and the cockpit panel 13.

The control CPU 15 interacts with a programmable counter timer circuit (CTC) 56 to provide a scheduled selected interrupt to the control CPU 15, for example, every 30 milliseconds. These regular interrupts provide a wakeup signal to the control CPU 15. The control CPU 15 utilizes this wake-up interrupt as an opportunity to reset the watchdog timer 18 and to determine if the GPS receiver 203 is working. The control CPU 15 has a count register to keep count of these interrupts and if sixty (60) CTC interrupts occur (60×0.030=1.8 seconds) before the GPS receiver 203 sends another message (the GPS responds at one second intervals) then the GPS receiver would be considered as not responding. A GPS receiver "not working" message would be developed and transmitted to the remote CPU means.

The control CPU 15 interacts with the watchdog/reset timer means 18 as a continuous monitor function. The watchdog reset timer is a counter that decrements over a period of approximately 600 milliseconds after it is set. If the CPU continues to set (or reset) the watchdog timer it never is given an opportunity to reach zero at which time it would reset the CPU. The control CPU 15 resets the watchdog timer at each 30 millisecond CTC interrupt.

As shown in FIG. 2, the cockpit panel 13 of the craft is coupled to the CPU 15 by an electrical interface 14. Various independent electrical connections of the interface 14 are designated by the reference 14/1; 14/2 and so forth and have functions as follows:

14/1 serial port input/output (I/O) for programming Control CPU 15 from panel using another CPU;

14/2 ignition switch operation sensing connection to CPU;

14/3 primary power sensing connection to CPU;

14/4 power to memory 21 of CPU from primary batteries;

14/5 output control signal from CPU to control power switch for GPS 2 and modem 9;

14/6 output control signal from CPU to control power switching means for master controller 4 and modem 7;

14/7 input to CPU for indication of battery failure from battery charger IC;

14/8 for producing visual indicator of state of emergency;

14/9 for producing visual indicator that battery service is requested;

14/10 for providing visual indication that the device is functioning;

14/11 for providing a visual indication of a cockpit activation;

14/12 cockpit manual switch operation sensing connection to CPU testing of system;

14/13 for producing visual indicator of GPS failure.

14/14 for visual indicator that transmitter is active.

The SRAM 20 (See FIG. 10) is divided or partitioned to allow sections to be utilized as counter registers, common software flags and a circular buffer.

Figure 10:
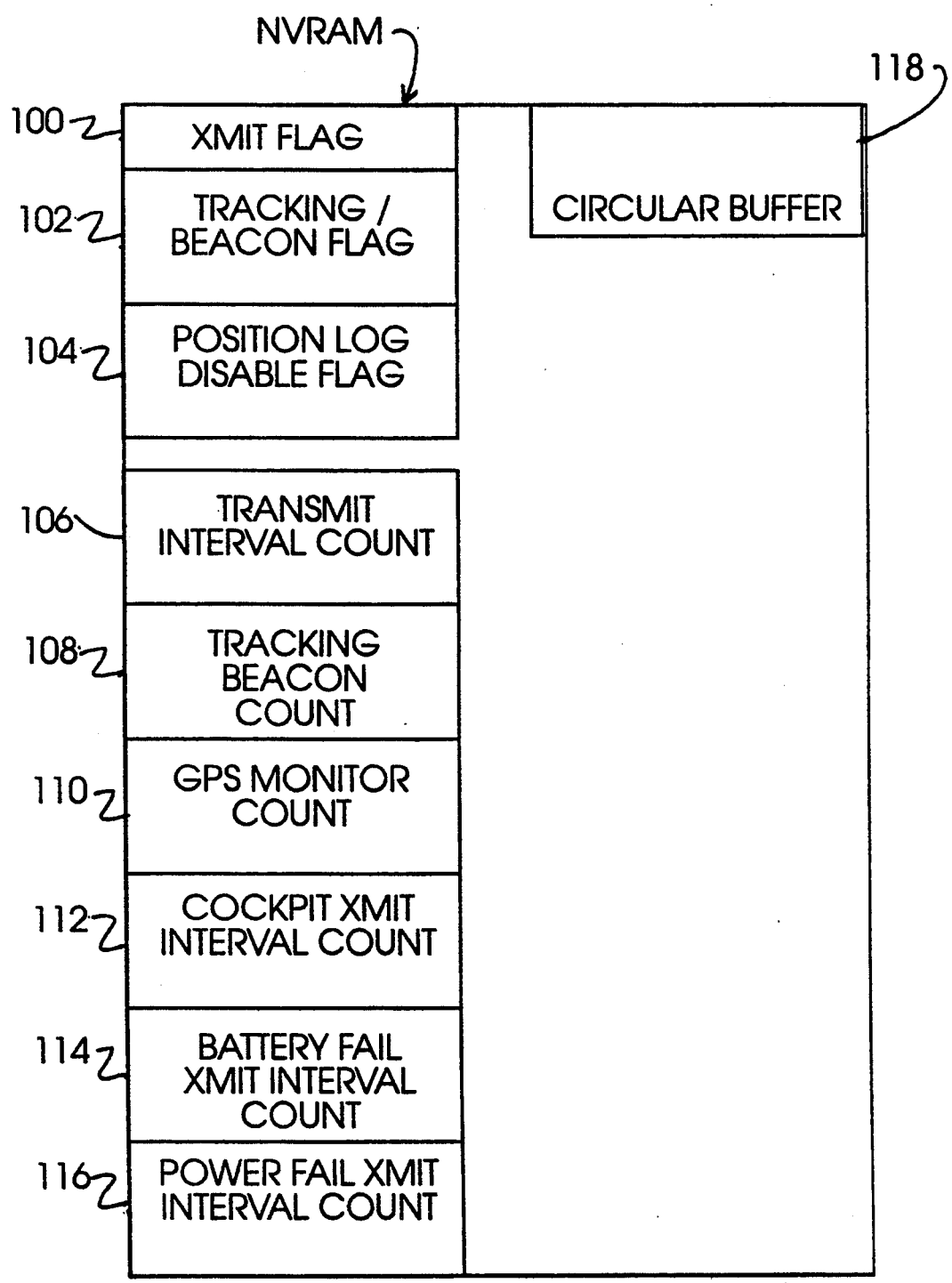
FIG. 10 is a partial schematic representation of program functions in the SRAM 20.

As shown in FIG. 10, the SRAM 20 has a transmit flag 100, a tracking beacon flag 102, and a position log prevent flag 104 (prevents logging of current position). The SRAM 20 also includes a transmitter interval counter 106, a tracking beacon counter 108, a GPS monitor counter 110, a cockpit transmit interval counter 112, a battery fail transactor counter 114, a power fail transmitter interval counter 116, and a circular buffer 118.

Cockpit Instruments

Figure 3:
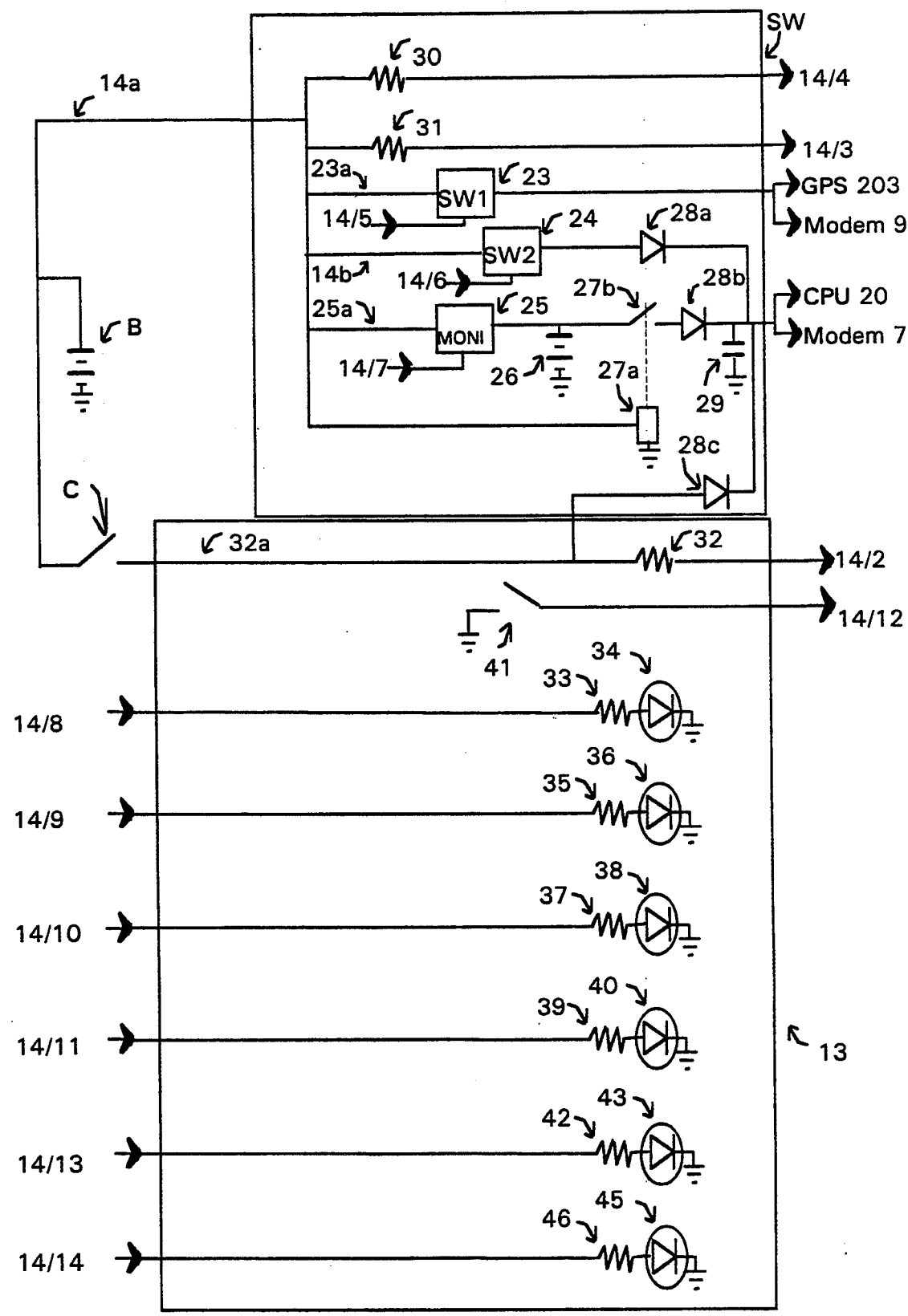
FIG. 3 is a partial electronic schematic illustration of the power distribution and cockpit indicators.

Referring now to FIG. 3, and various cockpit instruments in the cockpit panel 13 together with a switching means (SW) are schematically illustrated. The primary batteries B of the aircraft which supply power for the aircraft are connected via conductors 14a, 14b to a first power switch means 24 and an isolation diode means 28a which are interposed between the power supply of the primary batteries B and the master controller CPU means 204 and the radio modem means 7. The switch means 24 is controlled by the CPU interface 14/6.

Craft battery power is also connected by an ignition switch C through a conductor 32a and an isolation diode means 28c to the master controller 204 and to the modem 7.

Power can also be available to the master controller 204 from a backup battery means 26 through relay switch 27b and an isolation diode 28b. The backup battery 26 is connected to a battery charger and monitor for a charge controller 25 which is connected by conductors 25a, 14a to the primary batteries B for a continuous float charge. The battery monitor 25 is connected by a CPU interface 14/7 to the CPU 15. The charge capacity of the backup battery 26 is monitored by the battery monitor 25 and the CPU 15 is notified automatically whenever the monitor 25 determines that the battery will not hold a charge ("battery fail"). When the battery monitor means 25 activates the Control CPU 15 with a battery fail signal, the control CPU 15 performs the program steps required to transmit a "failed battery" status transmission packet. Upon activation by the battery monitor means 25 (see FIG. 3), the master control CPU 15 extracts the craft data information contained within the EEPROM means 16, constructs a transmission packet in SRAM memory 20, then transfers the data packet to the radio modem means 7 by serial cable means 8 for subsequent transmission to a remote CPU.

Battery power from the aircraft is connected by conductors 14a, 23a to power switch means 23 which connect to the GPS receiver means 203 and the radio modem means 9. The switch means 23 is controlled by a CPU interface 14/5.

Detection of disconnection/loss of main power connection is performed by the SRAM means 21 as follows: During initial programming of the control CPU 15, an identifiable data pattern (such as Ox5a5a hexadecimal) is written into the SRAM memory 21 of the CPU means 204. As shown in FIG. 3, the primary battery source B is coupled by a voltage dropping resistor means 30 and electrical conduit lead 14/4 to a backup supply lead of the SRAM memory 21 so that if primary power is disconnected from the system, the pattern will be lost (thus providing a means of identifying disconnection of the system from the primary power).

The cockpit activator/indicator panel means 13 also provides a manual activation/reset switch means 41 (see FIG. 3) for the purpose of manual activation for emergency and testing purposes. The switch 41 is connected to master control CPU 15 by an interface 14/12.

The cockpit activator/indicator panel means 13 provides visual indications as to the state and functioning of the system. Visual indicators 34, 36, 38, 40, 43, 45 respectively are provided for the emergency status mode, for service required, for a system-up indicator, and for cockpit activation for GPS fail and for transmitter active. The visual indicators are driven by the master control CPU 15 interfaces 14/8, 14/9, 14/10, 14/11, 14/13 and 14/14 respectively.

The master control CPU 15 has a parallel port of 16 bits which are utilized for low voltage binary switch sensing inputs, switch control outputs, and binary cockpit indicator outputs defined as follows:

The primary battery power of the craft batteries on conductor 14a connects through a primary power sense means 31 to the master control CPU 15 by the interface 14/3. The CPU 15 will read as a binary "1" when power is present and a binary "0" when power is absent.

The connection of the ignition switch C is ascertained by an aircraft ignition switch sense means 32 connected to the conductor 32a and to the master control CPU 15 parallel port through interface 14/2 to provide an input bit signal when the ignition switch is on.

The emergency status indicator means 34 is coupled through current limiting resistor means 33 from the master control CPU 15 via the interface 14/8 to provide a signal from the CPU 15 when in an emergency state of operation is made to activate a visual or audible indicator 34.

The "battery service required" indicator means 36 is coupled through current limiting resistor means 35 from the master control CPU 15 via interface 14/9 to provide a signal from the CPU 15 when battery service is required.

The "System up indicator" means 38 is coupled through current limiting resistor means 37 from the master control CPU 15 via interface 14/10 to provide a signal from the CPU 15 when it is functioning normally.

The cockpit activation indicator means 40 is coupled through current limiting resistor means 39 from the master control CPU 15 via interface 14/11 to provide a signal from the CPU 15 when an activation/reset operation is made from the cockpit control 41.

The GPS Fail indicator means 43 is coupled through a current limiting resistor means 42 from the master CPU 15 via interface 14/13 to provide a signal from the CPU where the GPS fails.

The transmitter active means 45 is coupled through a current limiting resistor 44 from the master CPU is via interface 14/14 to provide a signal from the CPU where the transmitter is activated.

Referring to FIG. 3, when primary power is removed from the system, a power switch solenoid means 27a activates the switch 27b to connect the back up battery means 26 to the CPU 204 and to the modem 7. During the transition from the primary power to the battery power means 26, the master controller CPU means 204 receives power from a capacitor 29 which provides temporary power means.

During periods of primary (aircraft) power disconnection, the master controller CPU means 204 and the radio modem means 7 transmit "power disconnect" message.

Start Up or Power Up Routine

Figure 4:
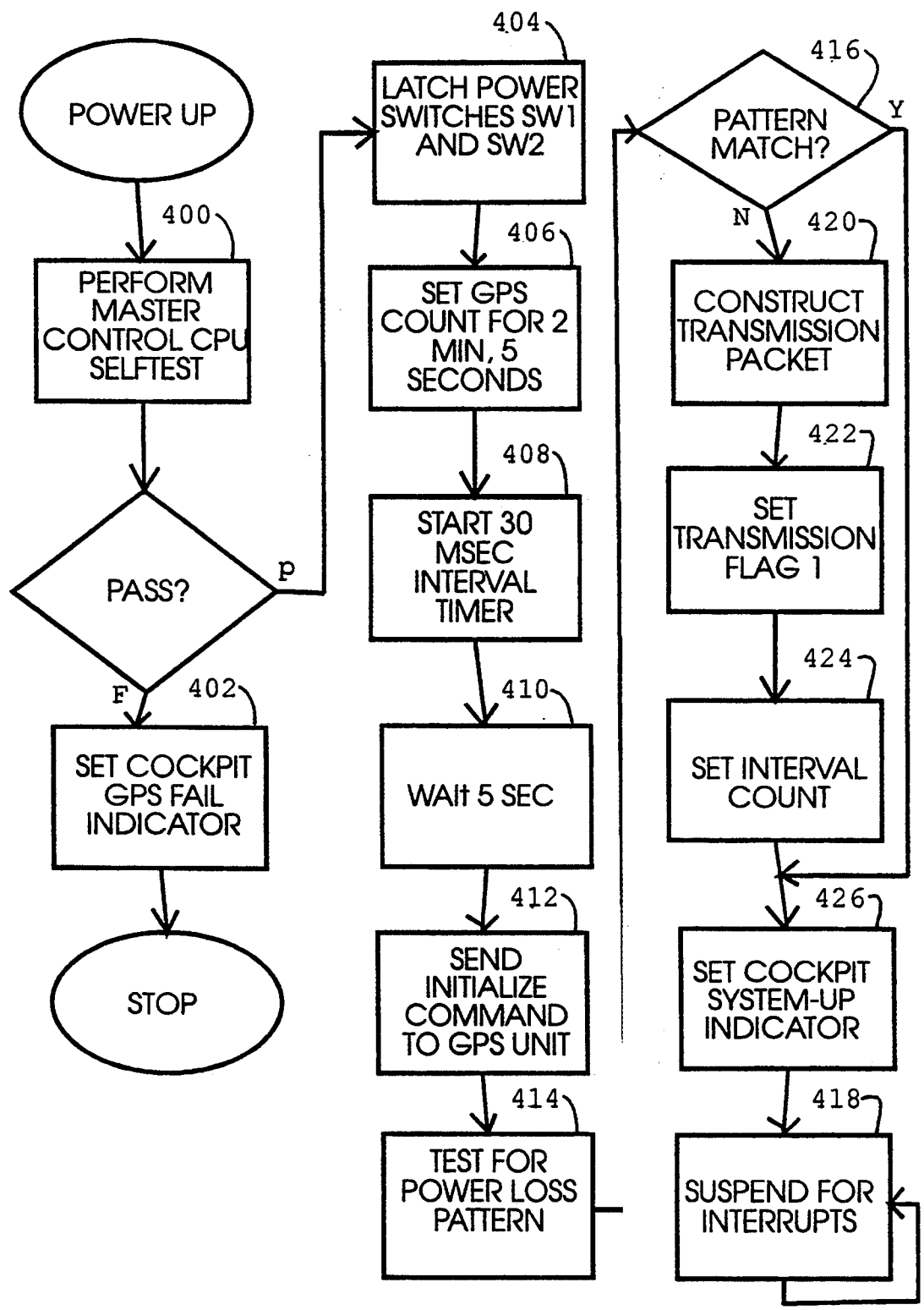
FIG. 4 is a representation of a computer program.

In operation of the system, when power is applied to the system, (refer to FIG. 4 for program steps for power up sequence) a program instruction to the master control CPU 15 initiates the execution of a series of startup instructions in the pre-loaded software program contained within the program memory means 17. The program initiates a self test (step 400) to ascertain if all of the following conditions are met by the master control CPU:

(1) that the program checksum (and hence the program) is valid;

(2) that all of the memory in the system properly functions;

(3) that the GPS unit properly functions;

(4) that the radio modem means 7 properly functions;

(5) that the radio modem means 9 properly functions;

(6) that the battery charger and monitor indicates proper charging and functioning of the battery.

If a component malfunctions or fails, the GPS fail indicator 43 in the cockpit is set (step 402) by the interface 14/13 to provide a visual or audio indication.

If all of these functions pass or are met or satisfied by the system, the latch switches 23 and 24 are actuated (step 404). The GPS timer circuit 51 in the control CPU 15 sets a GPS count for two minutes, five seconds (step 406). Next the timer 50 is started (step 408) to provide pulse signals at 30 MSEC intervals. After a time delay of 5 seconds (step 410), the master control CPU 15 sends an "initialize" or reset instruction to the GPS receiver unit 203 (step 412) via the serial interface 3 and then waits a maximum of two minutes for a response from the GPS receiver unit 203. The master control CPU 15 is connected to the GPS receiver means 203 commanding the GPS receiver to provide position (latitude, longitude, altitude), velocity, heading and time updates at each one second interval. A monitor count register in the SRAM 20 determines when two minutes have elapsed by (GPS monitor count register) counting time interrupts pulses to provide a time for response of the GPS 203 within the 2 minutes time period. If two minutes elapse (on 4000 timer interrupts) without a GPS response, then the GPS monitor count register has decremented to zero and initiates a GPS failure indication. If a GPS response is detected within the two minute window, the GPS monitor count register is reset.

The pattern contained in SRAM means 21 (installed during installation programming) is read (step 414) and compared to the pattern contained in EEPROM means 16 (step 416)(also installed during installation programming). If the patterns match, primary power has not been removed from the system and the CPU 15 suspends for interrupts, (i.e. goes to sleep until awakened by the timer, modem 7 or 9, accelerometer 5, GPS receiver 2 or a cockpit control signal) (step 418). If the patterns do not match, a primary power disconnect notification packet is constructed in SRAM means 20 (step 420), a transmit flag is set in the SRAM 20 (step 422), then the notification packet is transferred to modem means 7 for transmission. The packet for transmission will contain a header ID which defines a primary power disconnect notification. An interval count register (transmitter interval count register) in the SRAM 20 is then reset (step 424) and the CPU suspends for interrupts (step 418).

GPS Message Handler Routine

Figure 5A:
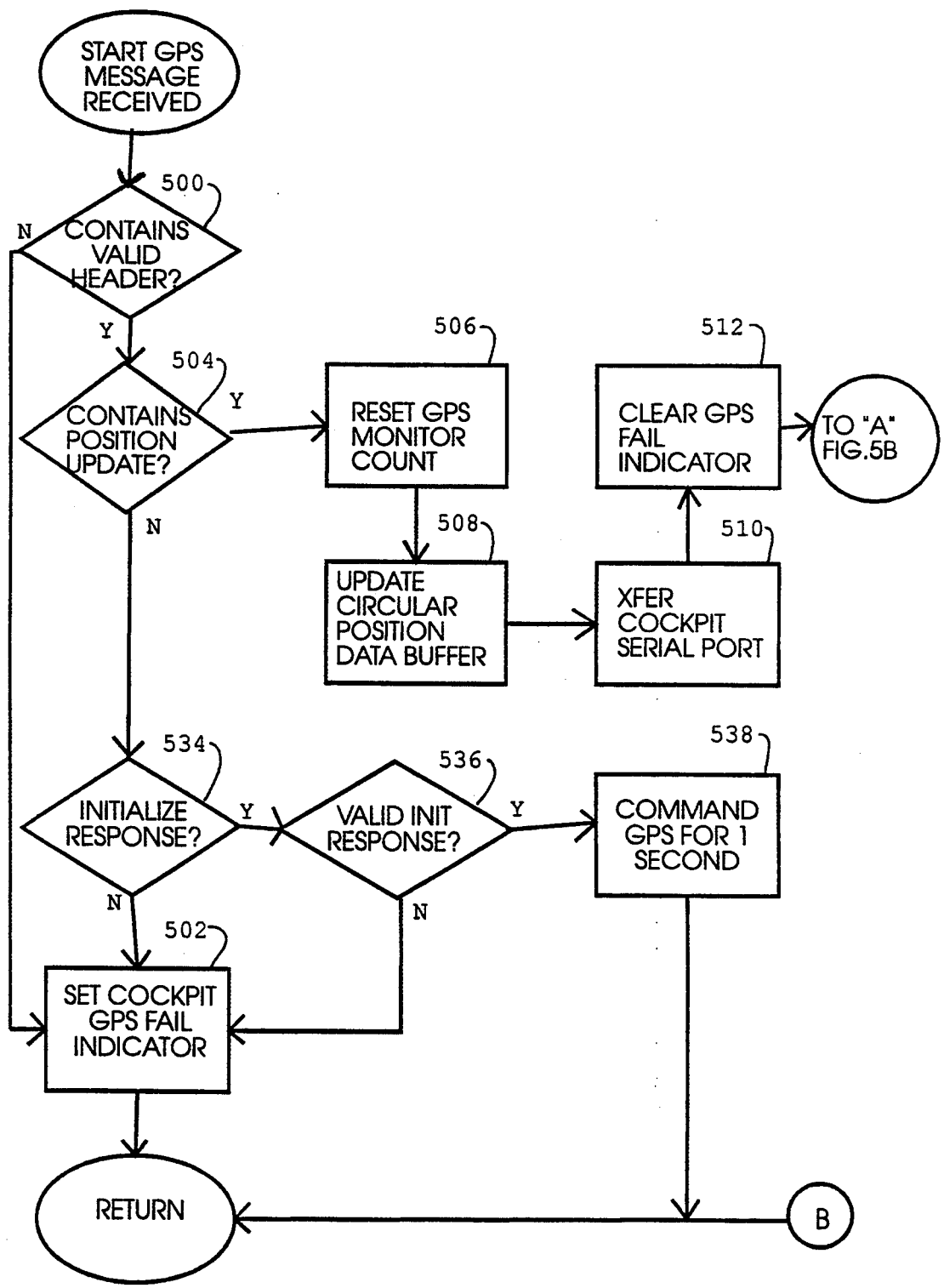
FIGS. 5A and 5B are a representation of a computer program.
Figure 5B:
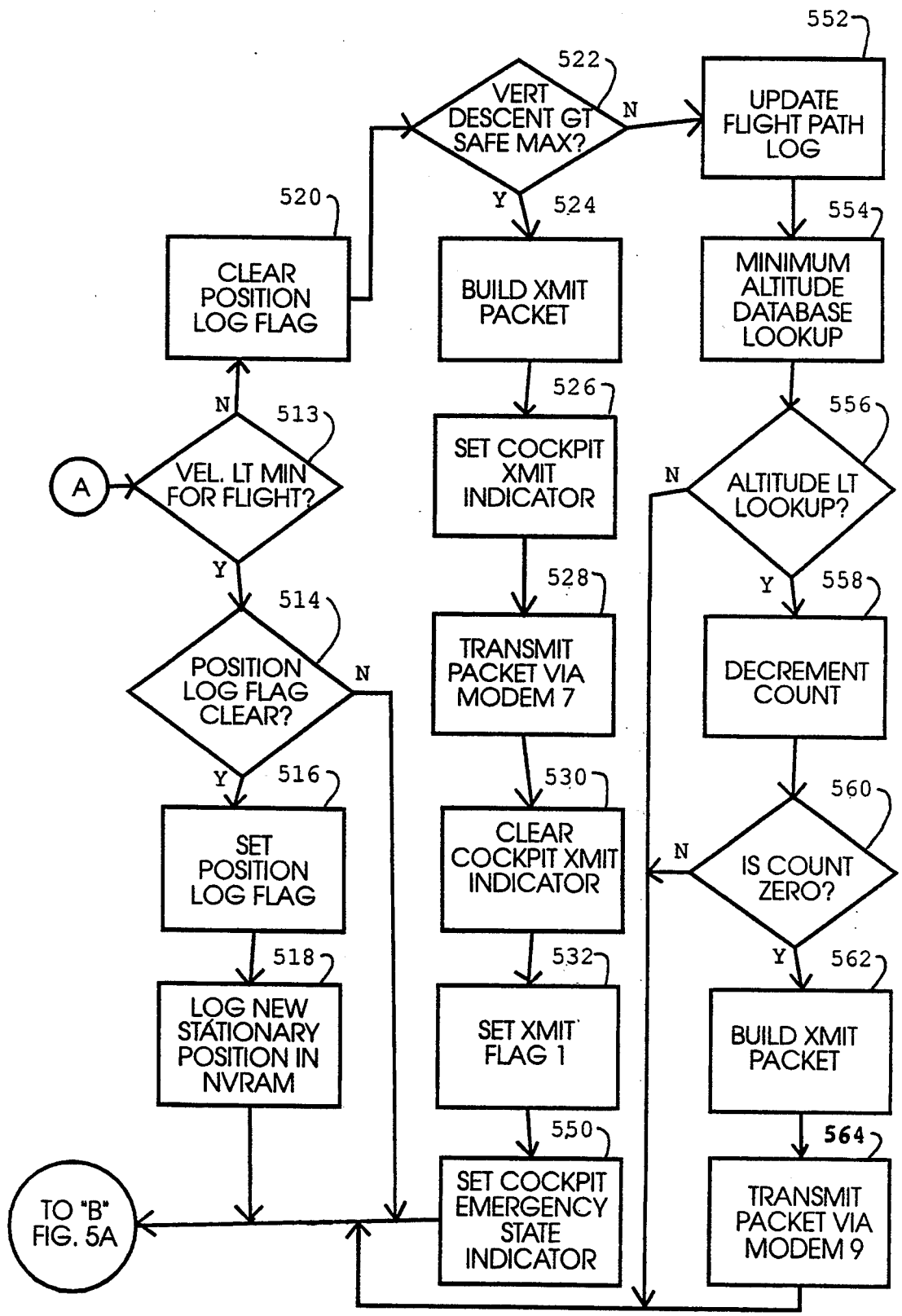
Figure 6A:
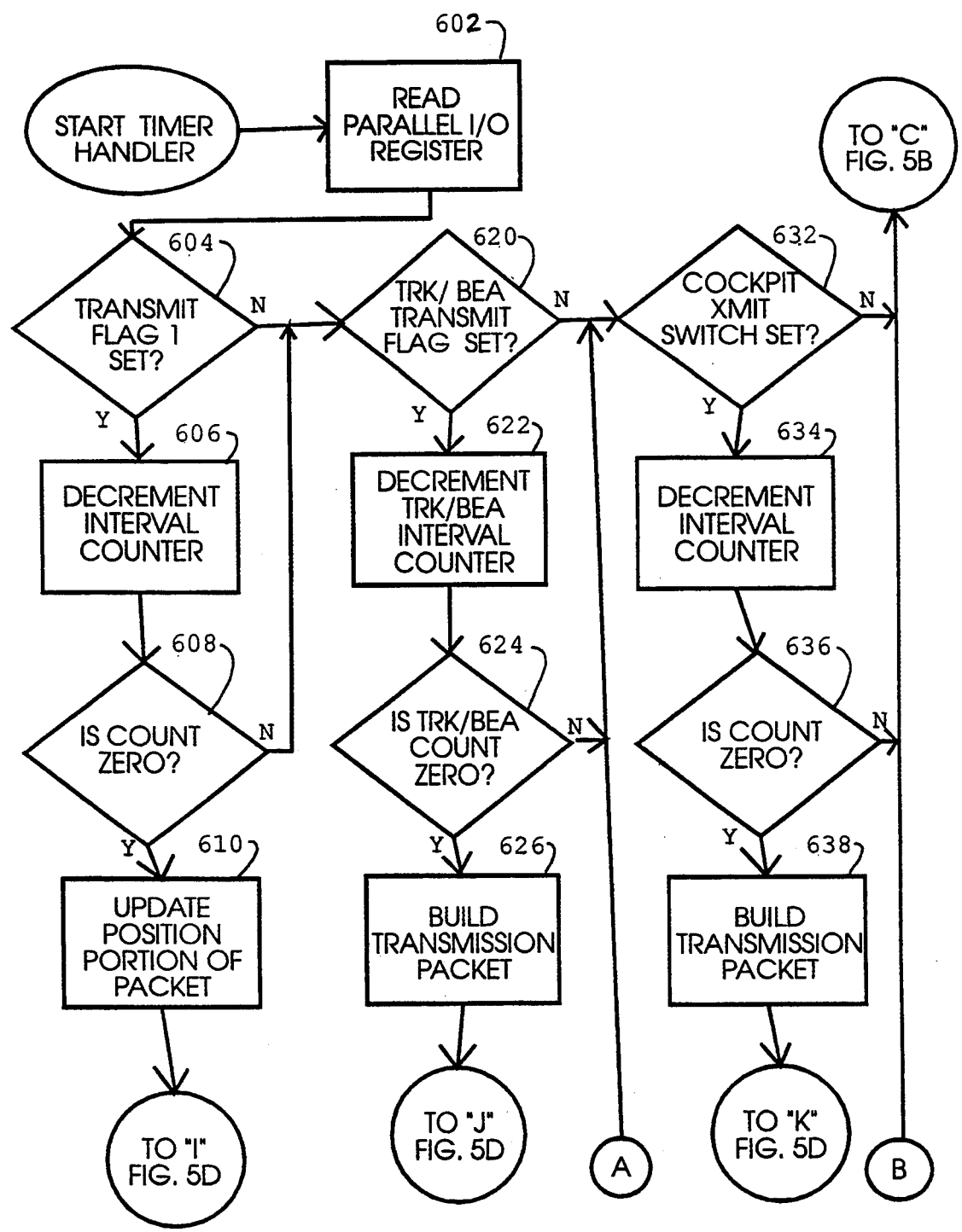
FIGS. 6A, 6B, 6C and 6D are a representation of a computer program.
Figure 6B:
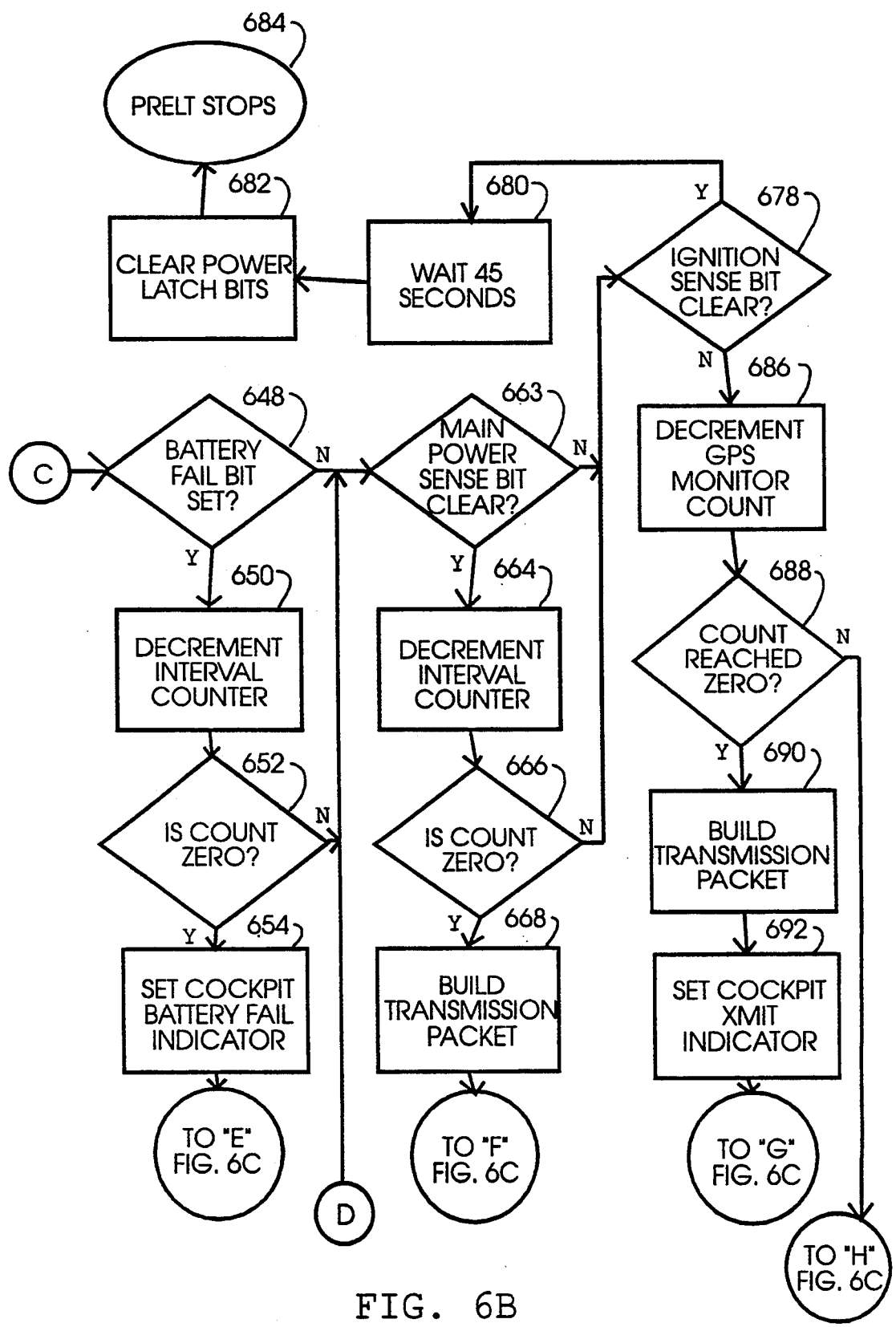
Figure 6C:
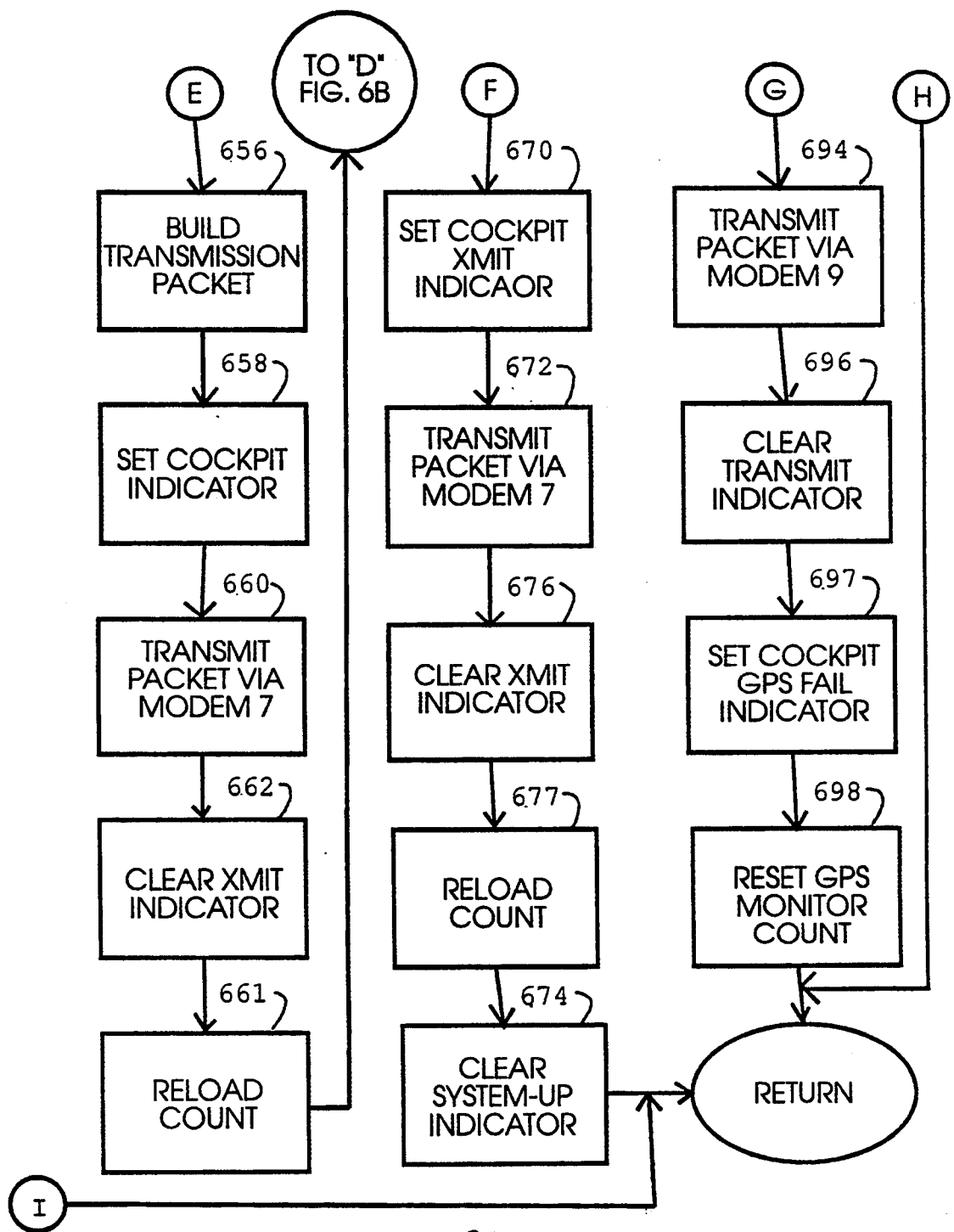
Figure 6D:
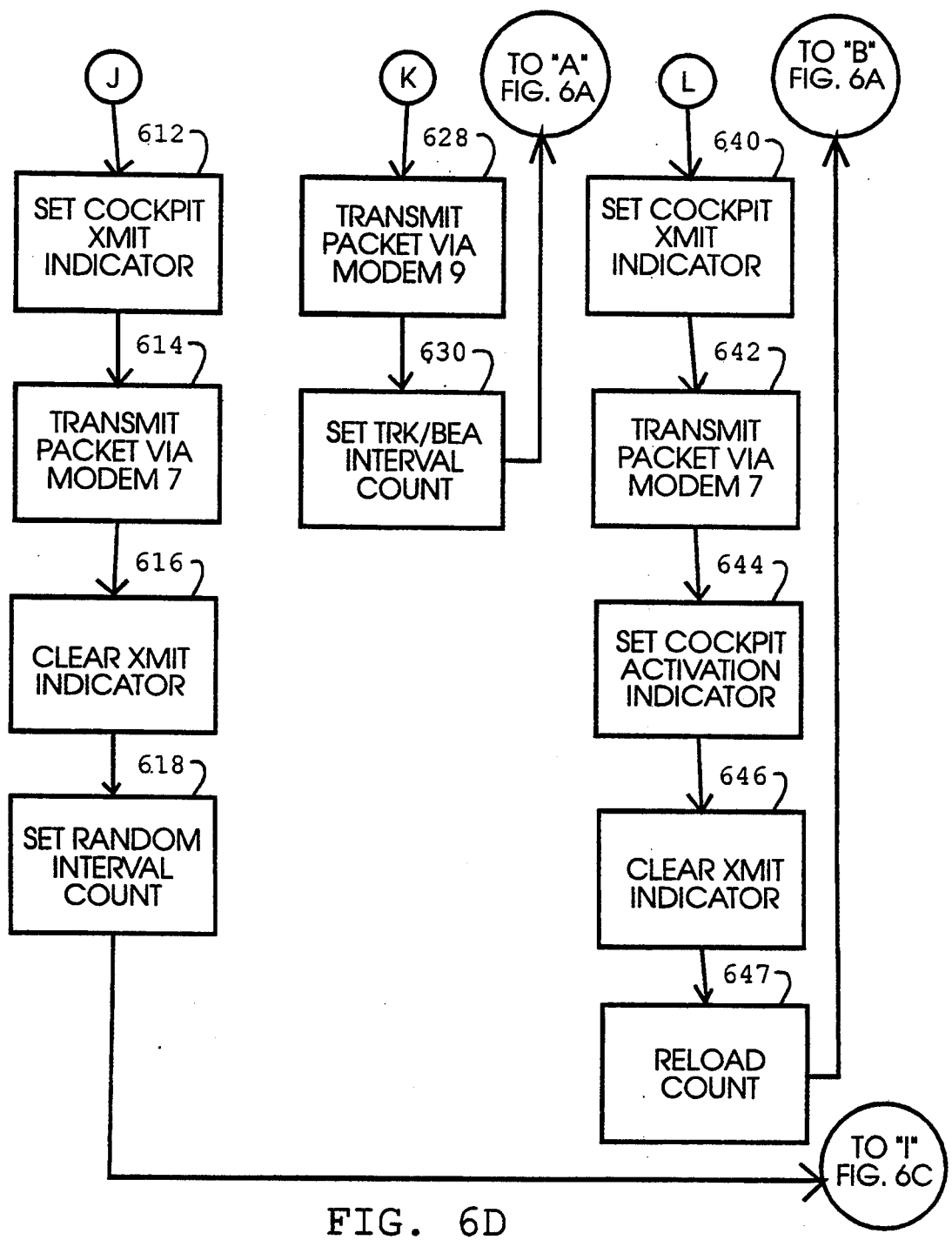
Figure 7A:
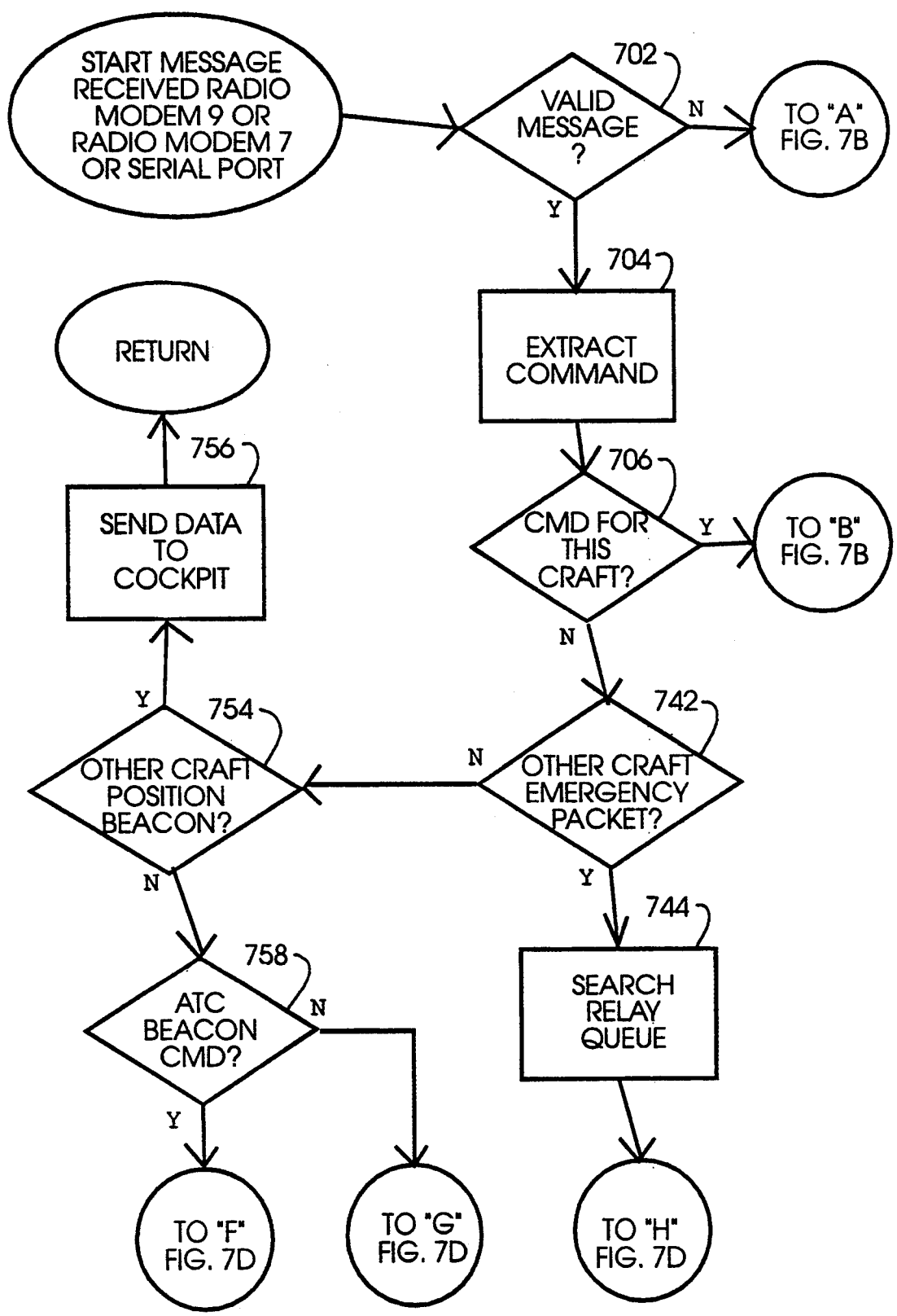
FIGS. 7A, 7B, 7C and 7D are a representation of a computer program.
Figure 7B:
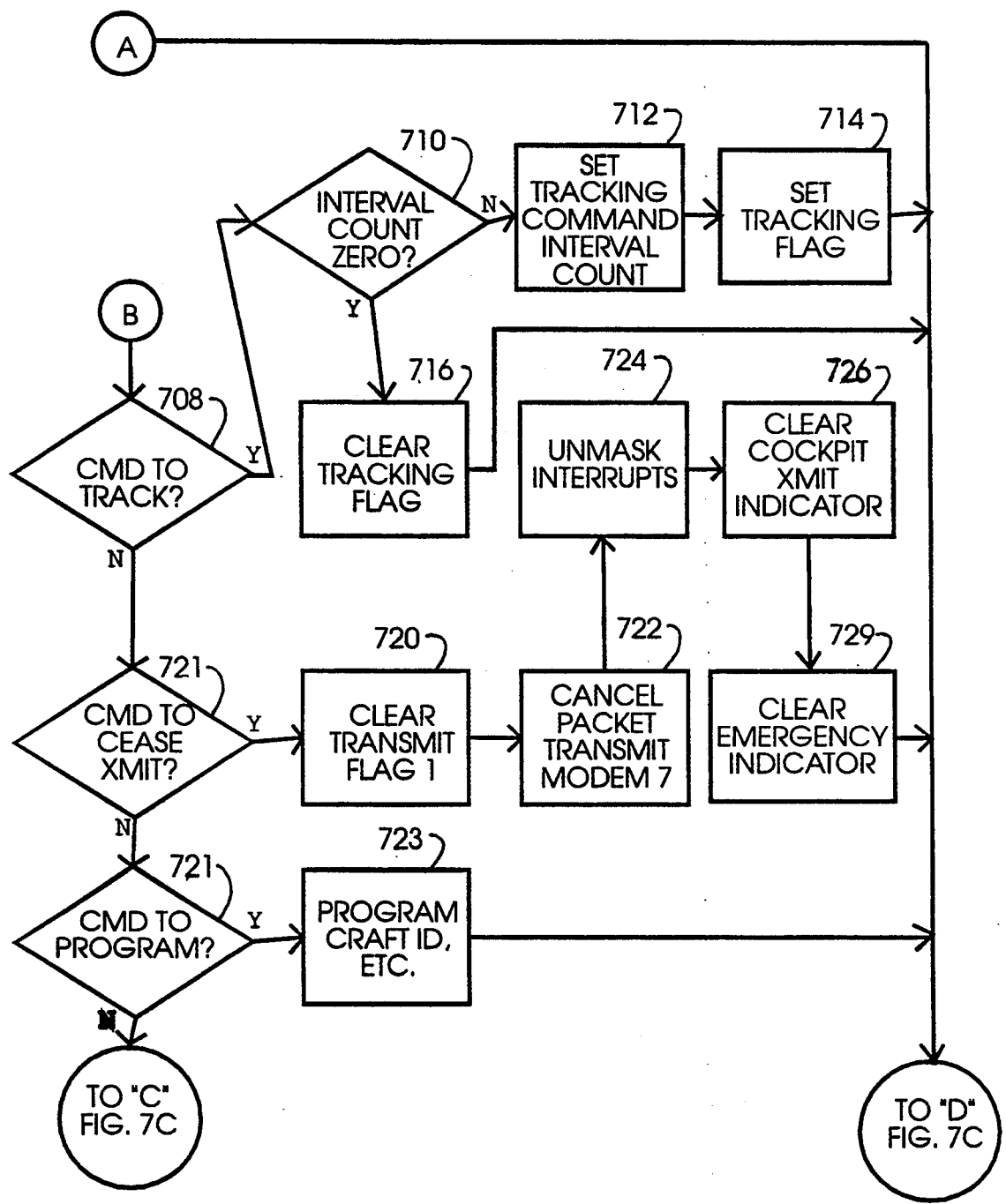
Figure 7C:
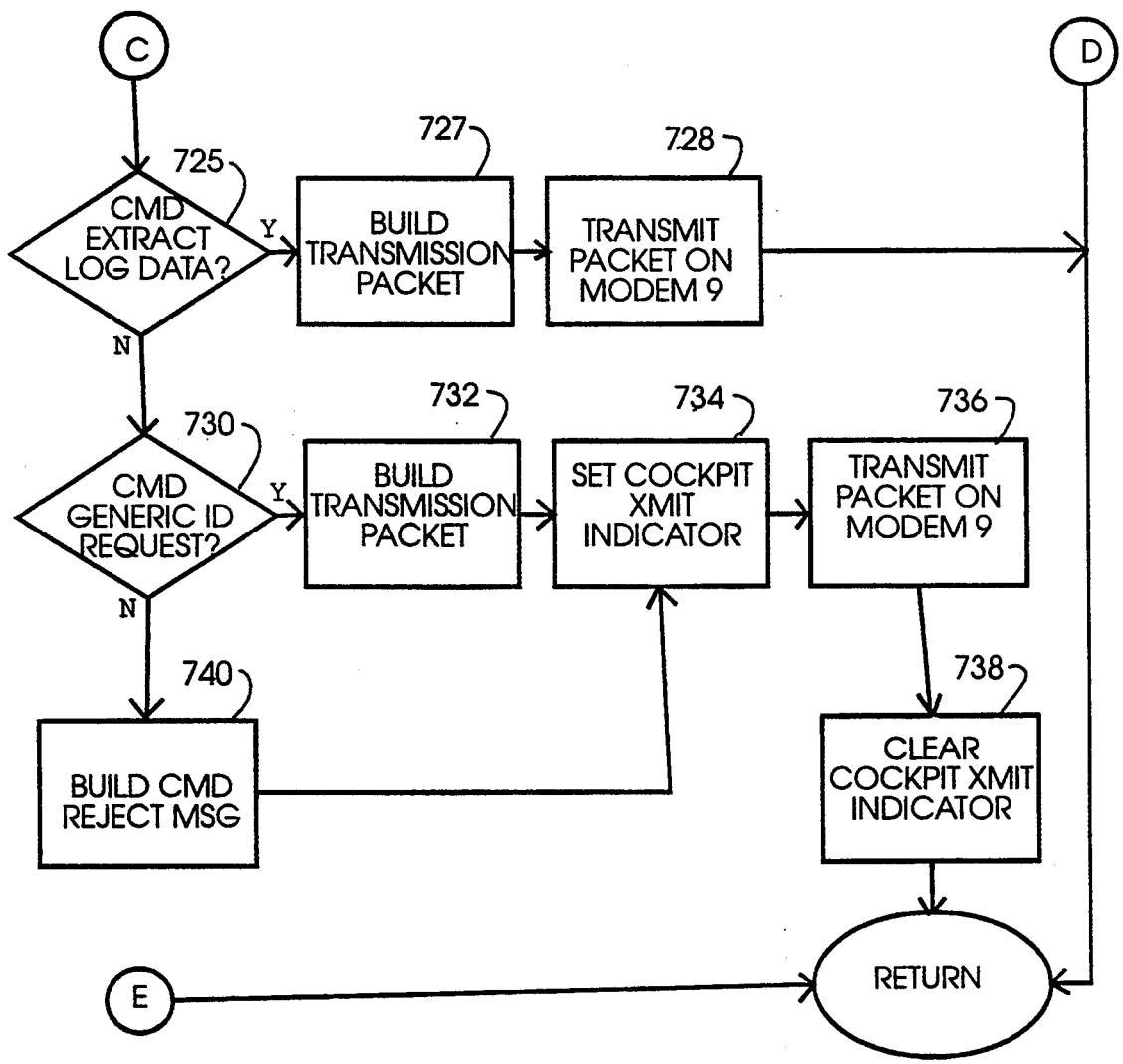
Figure 7D:
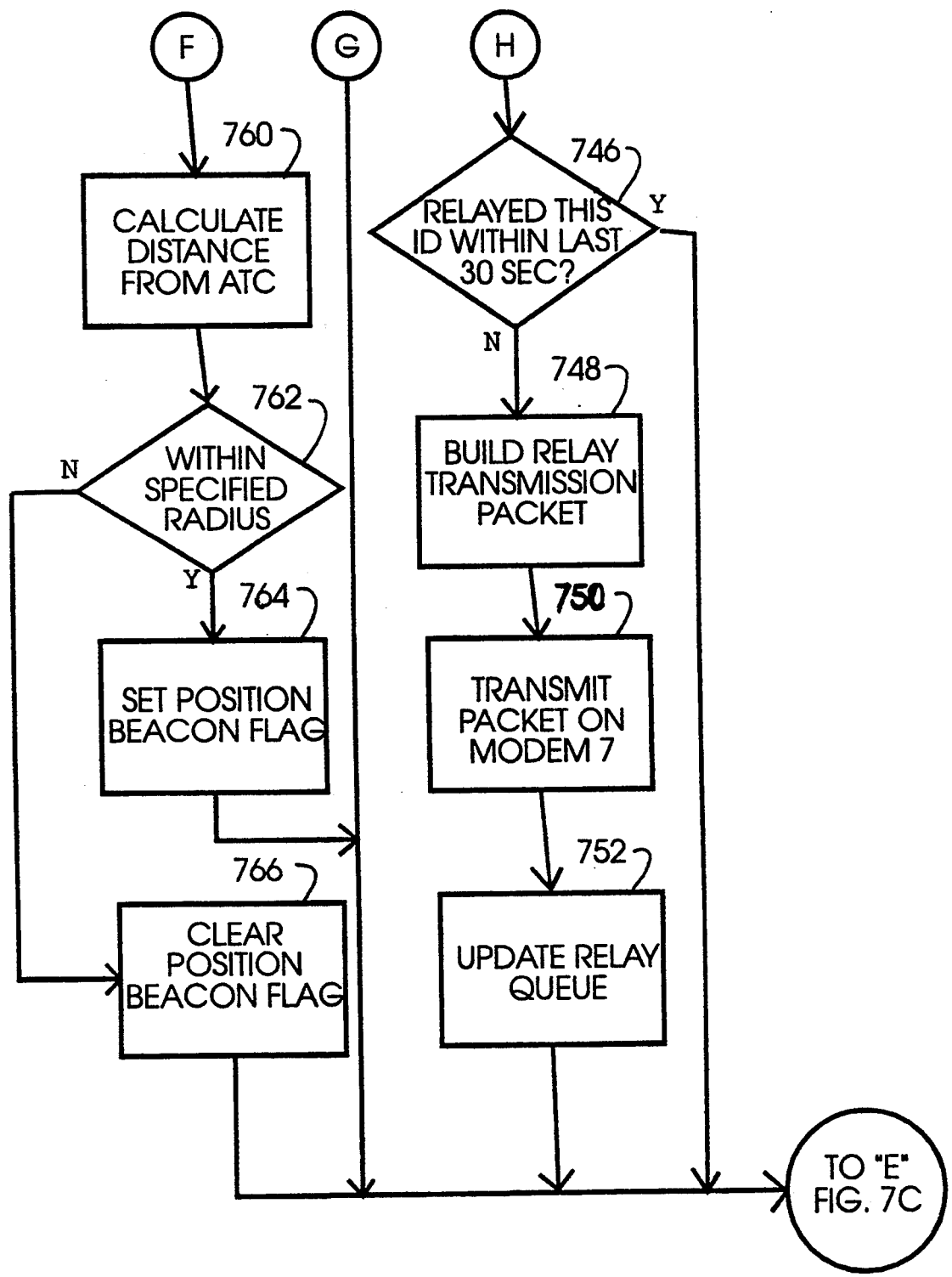

Referring to FIG. 5, the GPS means 203 initiates a GPS routine in memory 17 to provide a data message (at one second intervals) which includes an identification message header and an ID command to the CPU 15. The CPU 15 initiates a series of instructions or program within the memory 17. The program from the master control CPU means 204 includes a validity test on the message header received from the GPS means 203 to determine if the rest of the message information is valid ( Step 500). If the message header is not recognized as valid, the GPS "fail indicator" 43 in the cockpit is set (step 502) to provide a visual or audible indication of an invalid GPS message.

With a valid header message, the ID of the message is checked to determine if the message contains a position update command or is a response to the power-up initialization sequence (step 504).

If the message contains a position update command, the following sequence of operations would be performed:

A count register is reset for the GPS monitor (step 506). This register is a memory location in SRAM means 20 that is known by this routine and the "timer interrupt routine" (FIG.6). This register is reset once every second by the GPS routine in concert with the "timer interrupt routine". By decrementing the register every 30 MSEC (and the register reaching zero) the master control CPU 204 can determine that the GPS unit has not responded within the required time period.

The position data is extracted from the message and stored in the SRAM means 20. The position data includes latitude, longitude, altitude, heading, and time of data. Velocity is also included in the message. A circular buffer is utilized (an addressing scheme whereby the oldest entry is over written with the newest) to keep only the most recent and previous two position updates (step 508).

The position data is transferred to the cockpit via the cockpit serial port interface means 14/1 (step 510). The data transfers whether or not anything exists at the cockpit to receive it (provides future link to collision avoidance computer system).

The GPS "fail indicator" 43 is extinguished (clearing an already cleared indicator is OK) (step 512). The velocity data extracted from the GPS message is compared in step 513 against a minimum velocity value stored in EEPROM means 16 (during installation programming). The minimum velocity value is that required to maintain flight and is specific to that type of aircraft. A software flag ("position logging flag") is utilized in the SRAM 20 to determine whether or not to log a new position data in EEPROM means 16. If the velocity is less than is required to maintain flight (landing or already on the ground) the state of the position flag is tested (position log disable flag) (step 514) and if the state of the flag is clear, the position flag is set (step 516) and the position data is stored in EEPROM means 16 (step 518). If the state of the position flag is position or set (step 516), no action is taken. The position flag test prevents continuous logging of the same position. If the velocity is more than is required to maintain flight (airborne), the software position flag is cleared (step 520) (clearing an already cleared position flag is fine). Next a rapid descent determination is performed (step 522). Comparing two consecutive altitudes and times yields the current craft descent rate. If the current craft descent rate is greater than the maximum descent velocity value stored in the EEPROM means 16 (step 522) (during installation programming) an emergency transmission is initiated. The transmission involves:

1. constructing the transmit packet in SRAM means 20 (step 524);

2. set transmit cockpit indicator 45 (step 526)

3. transferring the constructed transmit packet from SRAM means 20 to the modem means 7 via serial port means 8 (step 528), 4. clearing of the cockpit indicator 45 for transmit indication (step 530), 5. setting the transmit flag (step 532)(a memory location in SRAM means 20 that is known by this GPS routine and the timer interrupt routine).

6. setting the emergency state indicator 34 in the cockpit (Step 550).

If the current craft descent rate is not greater than the maximum descent velocity, update the flight path log (step 552). The flight path log is a circular buffer in SRAM means 20 which is used to log position every 60th position update. The size of the buffer is not intended to be restricted here but for example, 180 entries would allow for logging of the last three hours of flight path. The flight path information can be extracted via the radio modem 9 (refer FIG. 7 steps 725, 727, and 728).

The device allows for a comparison of current position to a database of restricted positions. The craft LAT/LON is used as an index into a database of positions stored in EEPROM means 16, which returns an altitude lookup (step 554). If the craft altitude is less than the database specified minimum for that LAT/LON (step 556), a counter is decremented (step 558) and tested (step 560). When the counter reaches zero, a "low altitude" packet is constructed (step 562) and then transmitted (step 564) and the count register is reset (step 565). As elsewhere, the counter stretches out the packet transmission interval. Returning to Step 504, if the GPS message contains an "initialize" or reset response (step 534), the response is tested for errors (step 536) (specified by the GPS receiver manufacturer). If there are no errors in the initialization response, a command is sent to the GPS receiver to begin sending one second position updates (step 538). If the message received by the GPS is unrecognizable or contains an incorrect response to the initialize command, or is not one of the commands supported by the system, the GPS "fail indicator" 43 is set (step 540).

Accelerometer Activation Routine

The reception of an interrupt from the accelerometer means 205 will result in the master control CPU 15 executing a series of pre-loaded software program instructions (see FIG. 8) contained within the program memory means 17 to format and transmit via modem means 7 a packet or message containing craft ID and position data.

Upon activation by the accelerometer 205, the Control CPU 15 initiates execution of a sequence of instructions (see FIG. 8) to perform the following steps;

(1) the accelerometer interrupt is masked off (step 802) (otherwise the CPU would be "hung" on the interrupt)

(2) the position data stored in the SRAM means 20 is copied to EEPROM means 16 (step 804).

(3) a transmission flag is set (step 806) (a memory location in SRAM means 20 that is known by this routine and the timer interrupt routine)

(4) a transmit packet is constructed on SRAM means 20 by utilizing the information stored in EEPROM means 16 (step 808).

(5) the emergency state indicator 34 (step 810) is set for transmit indication.

(6) the constructed transmit packet is transferred from SRAM means 20 to the modem means 7 via the serial port means 8 (step 812), (7) a random transmit interval count register in the SRAM 20 is set (step 814)

Timer Interrupt Routine

The counter timer circuit 54 is programmed during the initialization routine (Step 408) to provide timer interrupts at desired intervals, i.e. 30 MSEC. Upon the reception of a timer interrupt from the timer means 56, the master control CPU 15 executes a series of pre-loaded software program instructions (see FIG. 6) contained within the program memory 17. The master control CPU 15 then takes the actions defined by the software program (FIG. 6). The master control CPU 15 reads the control and sense signal means (14/2–14/11) (step 602) to determine the status of the various sensed inputs.

The transmission flag in the SRAM 20 is checked for a "set" condition (step 604). If the transmission flag is set, the transmit interval count memory location is decremented (step 606) and tested for zero. If the content of the transmit interval count location is zero (Step 608), the position data section of the transmission packet is updated (step 610), the cockpit indicator 45 for transmit is lighted (step 612), the packet is transferred to modem means 7 for transmission (step 614). The cockpit indicator 45 for transmit is then extinguished or cleared (step 616) and the transmission interval counter is reset (step 618).

If the transmission flag is not set or the interval count memory location content is non-zero, a software tracking/beacon flag is checked for a "set" condition (step 620). If the flag is set, a tracking/beacon transmit interval count memory location is decremented (step 622) and tested for zero (step 624). If the contents of the tracking/beacon interval count memory location is zero, a current position packet is constructed (step 626) and then the packet is transferred to modem means 9 for transmission (step 628). The packet will contain the header ID defined for a position update. The tracking/beacon transmit interval count is then reset (step 630). After transmitting the tracking/beacon packet, or if the tracking/beacon interval count was non-zero, or if the software tracking/beacon flag was not set, the various sense signals are tested for cockpit activation.

The cockpit manual activation switch sense is tested for a "set" condition (step 632). If the switch is set, the transmit interval count memory location is decremented (step 634) and tested to zero (step 636). If the content of the interval count memory location is zero, a transmission packet is constructed ( step 638) and the cockpit indicator 45 for transmit is lighted (step 640). The current position packet is transferred to modem means 7 for transmission (Step 642). The packet will contain the header ID defined for cockpit activation. The cockpit indicator 40 for cockpit activation is lighted or set (Step 644). The cockpit indicator 45 for transmit is then extinguished (step 646). Next, the interval count is reset (Step 647). After transmitting the cockpit activation packet, or if the transmit interval count was non-zero or if there was no cockpit manual activation sensed, the output of the charger is sensed.

The battery charger monitor or battery fail output signal sense is tested for a "set" condition (step 648). If the signal sense is set, the transmit interval count memory location is decremented and tested for zero (step 650). If the contents of the interval count memory is zero (step 652), the cockpit indicator 36 for battery failure is lighted or set (step 654); a battery fail packet is constructed (step 656), the packet will contain the header ID defined for battery failure; the cockpit indicator 45 for transmit is lighted or set (step 658); and then the packet is transferred to modem means 7 for transmission (step 660); the cockpit indicator 45 for transmit is then extinguished or cleared (step 662). The interval count is then reloaded (step 668). After transmitting the battery fail packet, or if the interval count was non-zero, or if the battery fail was not set, the primary power sense is tested (step 663).

The primary power sense is tested for a "clear" condition (power present is recognized as a logical "1" which tests to a "set" condition while power absent is recognized as a logical "0" which tests to a "clear" condition (step 663)). If the source is clear, the transmit interval count memory location is decremented (step 664) and tested for zero (step 666). If the content of the interval count memory location is zero, a primary power fail packet is constructed (step 660), the cockpit indicator for transmitting 45 is set (step 670) and the data packet is transferred to modem means 7 for transmission (step 672). The packet will contain the header ID defined for primary power failure. The cockpit indicator for transmit 45 is then extinguished or cleared (step 676) and the cockpit indicator for system up indicator is extinguished (step 674). The interval count is then reset (step 677). After transmitting the primary power fail packet, or if the interval count was non-zero, or if the primary power fail was not set, the next sense is tested.

When the ignition sense means 32 is sensed by the master control CPU 14/2, the master control CPU 15 executes a set of instructions grouped into a software subroutine(see FIG. 6) program to perform a series of operations to remove power from the unit after a specified delay period. The instructions result in a time delay before the control CPU 15 clears the power latch signal means 23 and 24.

The ignition power sense is tested for a "clear" condition (ignition power present is recognized as a logical "1" which tests to a "set" condition while ignition power absent is recognized as a logical "0" which tests to a "clear" condition (step 678)). If the sense is clear, the CPU suspends for 45 seconds (step 680) and then removes power to the GPS receiver and the CPU disconnects power via the controls 14/5 and 14/6 (step 682). The system halts until power is supplied via the ignition switch (step 684). If the ignition power sense is not clear (is set), the GPS receiver monitor count memory location is decremented (step 686) and tested for zero (step 688). If the count is non-zero, no action is taken. If the monitor count is zero (which occurs if the GPS serial port message handler does not periodically reset the count), a GPS fail packet is constructed (step 690) and the cockpit indicator for transmit 45 is lighted or set (step 692) and then the packet is transferred to modem means 9 for transmission (step 694). The packet will contain the header ID defined for GPS receiver failure. The cockpit indicator for transmit 45 is then extinguished or cleared (step 696) and the cockpit indicator for GPS failure is lighted or set (step 697). The monitor count is then reset (step 698).

Modem or External Control Operation or Cockpit Sense Port Routine

A remote CPU 202 may be used to transmit a message or packet to the aircraft by the modem means 9. The reception of a data packet in the modem means 9 results in the master control CPU 15 executing a series of preloaded software program instructions (see FIG. 7) contained within the program memory means 17. The master control CPU 15 will decode the command ID of the received data packet and take the appropriate action (i.e. program craft ID into EEPROM memory 16, transmit packet of data, etc.)

The system device in the aircraft will respond to external commands received from any of the serial ports. When the command is received from either the cockpit serial port or either radio modem 7 or 9, the command is validated and then acted upon (see FIG. 7).

The master control CPU means 204 performs a validity test on the message header received to determine if the rest of the message information is non-corrupt (useable) (step 702). If the header is not recognized/determinable, the entire message is ignored.

After validating the header, the message ID (tells action to be taken) and destination ID (specifically for this craft ID or for all craft) is extracted (step 704) to determine if the message is for the craft receiving the message (step 706). The destination ID in the message is compared to the craft ID stored in EEPROM means 16 (during installation programming) to determine if the message is a command directed specifically for this craft. If the destination ID matches the craft ID (Stored in the EEPROM); the message ID (now considered command ID) is compared to a list of valid possible actions.

If the command ID is recognized as a command to track (step 708), the tracking interval is extracted from the received command and copied to the tracking interval count register (step 710)(a memory location in SRAM means 20). If the tracking interval count is non-zero, the command interval is set (step 712) and the software tracking transmit flag is set (step 714). The PRELT will commence transmitting position updates at intervals specified by the tracking interval during service of the timer interrupt (see FIG. 6) (Step 620-630) as long as the tracking flag is set.

If the tracking interval count is zero, the software tracking transmit flag is cleared (step 716), ceasing tracking transmissions.

If the command ID is recognized as a command to cease transmission (step 718) (applies to all transmissions other than ATC beacon and tracking), the software transmit flag is cleared (step 720). A command is sent to modem 7 to cancel any packet in progress (step 722), all interrupts are unmasked (step 724) (allowing accelerometer activation again), and the cockpit transmit indicator 45 is cleared (step 726). The cockpit emergency state indicator is then cleared (step 729).

If the command ID is recognized as a command to program (step 721), the specified items are copied from the received message to EEPROM memory means 16 (step 723).

If the command ID is recognized as a command to extract position history (step 725), a transmission packet is constructed containing all positions stored in the EEPROM memory means 16 beginning with the oldest position stored (step 727). The packet is then transferred to modem means 9 for transmission (step 728). No indication of transmission is given to the cockpit area.

If the command ID is recognized as a command to identify (step 730), a transmission packet is constructed in SRAM means 20 containing craft ID and craft type (stored in EEPROM means 16 during installation programming), and latest position (stored in SRAM means 20 during last GPS update)(step 732). The cockpit transmit indicator 45 is set (step 734) and the packet is transferred to modem means 9 for transmission (step 736). The cockpit transmit indicator 45 is then cleared (step 738).

If the command ID is not recognized, a transmission packet is constructed in SRAM means 20 containing the command ID that will be recognized as a "command reject" and with the destination ID set equal to the source ID of the received message (step 740). This is effectively telling the sender of the last message that this PRELT recognizes that the command was intended for it but that the action to be taken is not understood. The cockpit transmit indicator 45 is set (step 734)(bit 2 of the POI is set) and the packet is transferred to modem means 9 for transmission (step 736). The cockpit transmit indicator 45 is then cleared (step 738).

If the destination ID in the message failed to match the craft ID stored in EEPROM means 16 during the initial test described above (step 706), the command ID is checked to determine if the message was an emergency/packet from some other craft (step 742) (called a distressed craft). Each PRELT has the capability to relay any emergency packet monitored via the following sequence of software steps. The message ID is compared to the list of preprogrammed emergency IDs (accelerometer activation, cockpit activation, etc,) and if a match is found, the distressed craft ID and a packet time are extracted from the received message and compared to a list (relay queue) (step 744) of craft IDs and the times stored in SRAM means 20. If a relay for the distressed craft has not occurred in the last 30 seconds (step 746) (for example), a relay packet is constructed in SRAM means 20 containing the distressed craft's packet as well as the relaying craft's ID and current position and current time (step 748). The packet is transferred to radio modem 7 for transmission (step 750) and then the relay queue is updated to prevent another relay transmission within a specified time interval (step 752) (30 seconds, for example). The relay system increases the probability of reception of an emergency message.

If the destination ID in the message failed to match craft ID stored in EEPROM means 16 during the initial test described above and the command ID was not from a distressed craft, the command ID is compared to the ID defined for craft position beaconing (step 754). If the command ID indicates that the message is a generic position update from another craft, the position data is transferred to the cockpit via the cockpit serial port interface means 14/1 (Step 756). The data transfers whether or not anything exists at the other end of the cockpit serial port interface to receive it (provides future link to collision avoidance computer system).

If the destination ID in the message failed to match the craft ID stored in EEPROM means 16 during the initial test described above and the command ID was not from a distressed craft, and the message was not a generic position message from some other craft, the command ID is compared to the ID defined for air traffic control (ATC) commanded craft position beaconing (step 758). If the command ID is to ATC beacon (similar to tracking but for a defined radius around some specific Lat/Lon specified in the command), the ATC Lat/Lon extracted from the command is compared to the latest Lat/Lon stored in SRAM, means 20 during the latest GPS position update and the distance is calculated (step 760). If the calculated distance is less than the radius (distance) specified in the command (step 762), the specified beacon interval counter is loaded and the position beacon flag is set (step 764). The first beacon transmission will occur when the beacon interval count reaches zero in the timer interrupt routine (see FIG. 6, step 620). If the distance to the ATC is greater than the specified radius (distance) then the beacon flag is cleared (step 766).

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A position reporting system for reporting a position of a movable aircraft-relative to the earth's surface where there is a Navstar GPS system in operation comprising:
   GPS receiver means in a movable aircraft for determining data parameters of position and time of said aircraft from the Navstar GPS system;
   CPU means in said aircraft coupled to said GPS receiver means for continuously storing said data parameters at time spaced intervals in time spaced data packets and for storing aircraft identification indicia;
   digital data transmission means coupled to said CPU means for transmitting said time spaced data packets containing the aircraft identification indicia, the position and the time data in a digital format to a remote receiver means;
   accelerometer means in said aircraft for responding to an acceleration of the aircraft in excess of a preset acceleration limit for activating said CPU means and said digital transmission means for automatic transmission of said data packets; and
   means for limiting the transmission of said data packets to the data packets stored in the CPU means at such time as an acceleration of the aircraft in excess of the preset limit occurs.

2. The apparatus as set forth in claim 1 where the means for limiting transmission operates to transmit a finite number of data packets.

3. The apparatus as set forth in claim 1 and further including:
   a manual switch means coupled to said CPU means for selectively activating said CPU means and said digital transmission means for selective transmission of said data packets independent of said accelerometer means.

4. The apparatus as set forth in claim 1 and further including:
   wherein said data packets at time spaced intervals include altitude and velocity data;
   said CPU means having programming instructions with a predetermined descent velocity value so as to be responsive to said data parameters for providing an emergency descent parameter representative of descent velocity;
   said CPU means being responsive to said predetermined descent velocity value being reached by said data parameters to provide an emergency descent parameter upon a descent of the aircraft which exceeds the predetermined descent velocity value, and
   wherein said CPU means and said transmission means respond to said emergency descend parameter to automatically transmit data packets which also include the descent velocity.

5. The apparatus as set forth in claim 1 for further including means in the aircraft for receiving data packets transmitted by a remote transmitter means and retransmitting such received data packets from the aircraft.

6. A communication system for determining a position of a movable aircraft relative to the earth's surface where there is a Navstar GPS system in operation comprising:
  GPS receiver means in a movable aircraft for determining data parameters of position and time of said aircraft from the Navstar GPS system;
  CPU means in said aircraft coupled to said GPS receiver means for continuously storing said data parameters at time spaced intervals in time spaced data packets and for storing aircraft identification indicia;
  digital transmission means coupled to said CPU means for transmitting said time data packets containing the aircraft identification indicia, position and the time data in a digital format to a remote receiver means; and
  modem receiver means in said aircraft for receiving data communications from a remote CPU means, said modem receiver means being responsive to received data communications for causing said digital transmission means to transmit data packets.

7. The apparatus as set forth in claim 6 and further including:
  battery power means in said aircraft for supplying power to said CPU means;
  non-volatile memory means in said CPU means for storing said data parameters; and
  accelerometer means in said aircraft for responding to an acceleration of the aircraft in excess of a preset acceleration limit for activating said CPU means and said digital transmission means and to access said non-volatile memory for automatic transmission of said data parameters in said memory means in said data packets.

8. The apparatus as set forth in claim 7 and further including circular buffer means in said CPU means for storing a number of successive aircraft positions independent of said non-volatile memory, said circular buffer means being responsive to said emergency event to transmit data packets including successive aircraft positions occurring prior to such emergency event.

9. The apparatus as set forth in claim 6 including means for comparing the consecutive positions to determine if the aircraft is stationary and for storing each stationary position in the memory means for providing a log of stationary positions.

10. A method for reporting the position of an aircraft relative to the earth's surface where there is a satellite based navigation system in operation, the method comprising the steps of:
  determining data parameters of position, velocity, heading, and current time with respect to said aircraft from signals received from the satellite based navigation system;
  continuously storing said data parameters in a digital data packets at time spaced intervals together with storing of identification indicia for the aircraft;
  determining the occurrence of an acceleration of the aircraft exceeding a preset acceleration limit for the aircraft; and
  automatically transmitting digital data packets containing the identification indicia and the data parameters at time spaced intervals to a remote receiver means upon the occurrence of an acceleration of the aircraft exceeding the preset acceleration limit.

11. The method as set forth in claim 10 and further including the steps of:
  receiving identification indicia and data parameters from another aircraft, and
  retransmitting the identification indicia and data parameters of the other aircraft from the receiver aircraft to a remote receiver means.

12. The method as set forth in claim 10 and further including the step of:
  receiving a radio transmitted command to transmit from a remote control CPU means, and
  transmitting the data packets containing the identification indicia and data parameters from the aircraft to the remote control CPU means.

13. The method as set forth in claim 10 and further including the step of:
  storing the identification indicia and data parameters in memory, and
  receiving a radio transmitted-command from the remote CPU means; and
  transmitting data packets containing the identification indicia and the data parameters to the remote CPU means.

14. The method as set forth in claim 10 and further including the step of:
  monitoring the velocity of descent of the aircraft and transmitting data packets containing the identification indicia and the data parameters from the aircraft whenever the descent velocity exceeds a predetermined descent velocity value.

15. The method as set forth in claim 14 and further including the step of:
  storing the data parameters in a circular buffer means and independently storing the data parameters in a memory means.

16. The apparatus as set forth in claim 6 wherein said data communications includes data parameters of position and time of another aircraft and where said CPU means is programmed for transferring said data communications to a cockpit interface.

17. The apparatus as set forth in claim 1 wherein said CPU means is powered by a primary power source and a non-volatile memory means containing an identifiable data pattern is coupled to the primary power source and to the CPU means for providing a disconnect indicator in a data packet whenever the primary power source is disconnected.

18. A digital automated vehicle impact magnitude and site transmission system for indicating the location of a moveable craft relative to the earth's surface when a preset sudden deceleration occurs and where there is a Navstar GPS system in-operation comprising:
  GPS receiver means in a moveable craft or vehicle for determining data parameters of position and time of said vehicle from the Navstar GPS system;
  CPU means in said vehicle coupled to said GPS receiver means for continuously storing and processing said data parameters at specific time spaced intervals in time spaced data packets and for determining and storing vehicle identification indicia and for analyzing input from accelerometer means and transmission commands where said time spaced data packets contain the vehicle identification, position and time data in a digital format;
  digital data transmission means coupled to said CPU means for transmitting/said time spaced data packets to remote receiver means;

accelerometer means in said vehicle for detecting and responding to an acceleration of the vehicle in excess of a preset acceleration limit for activating said CPU means and said digital transmission means for automatic transmission of said time spaced data packets; and means for limiting the transmission of said data packets to the data packets stored in the CPU means at such time as an acceleration of the vehicle occurs in excess of the preset limit.

* * * * *